United States Patent
Kim et al.

(10) Patent No.: US 9,395,947 B2
(45) Date of Patent: Jul. 19, 2016

(54) ELECTRONIC DEVICE AND CONTROL METHOD USING RELATIVE POSITION BETWEEN ELECTRONIC DEVICES IN THE ELECTRONIC DEVICE

(71) Applicant: Samsung Electronics Co., Ltd., Gyeonggi-do (KR)

(72) Inventors: Ji-Young Kim, Gyeonggi-do (KR); Mi-Sun Lee, Gyeonggi-do (KR); Bo-Kun Choi, Seoul (KR); Jae-Chan Koh, Gyeonggi-do (KR); Oh-Yong Kwon, Gyeonggi-do (KR); Moon-Young Woo, Gyeonggi-do (KR); Yoon-Jeong Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/333,015

(22) Filed: Jul. 16, 2014

(65) Prior Publication Data

US 2015/0169275 A1    Jun. 18, 2015

(30) Foreign Application Priority Data

Dec. 17, 2013    (KR) .................. 10-2013-0157438

(51) Int. Cl.
*G09G 5/00*    (2006.01)
*G06F 3/14*    (2006.01)
(Continued)

(52) U.S. Cl.
CPC ............ *G06F 3/1423* (2013.01); *G06F 3/1438* (2013.01); *G06T 7/0028* (2013.01);
(Continued)

(58) Field of Classification Search
CPC . G06F 3/04842; G06F 3/048; G06F 3/04817; G06F 3/017; G06F 3/011; G06F 7/00; G06F 2200/1637; G06F 3/0425; G06F 1/1626; G06F 2200/1614; G06F 17/30265; G06F 17/30817; G06F 1/163; G06F 1/1694; G06F 17/30011; G06F 17/30256; G06F 21/32; G06F 3/0317; G06F 3/03543; G06F 17/30032; G06F 17/30038; G06F 17/30244; G06F 17/30247; G06F 1/1616; G06F 1/1647; G06F 1/32
USPC ............. 345/173–175, 1.1–1.3, 2.1–2.3, 156, 345/169
See application file for complete search history.

(56) References Cited

U.S. PATENT DOCUMENTS 8,861,310 B1 * 10/2014 Karakotsios et al. ......... 367/124
2006/0088277 A1 * 4/2006 Lee ................................ 386/46
(Continued)

FOREIGN PATENT DOCUMENTS

JP    2003-005947 A    1/2003
KR    1020090013534 A    2/2009

OTHER PUBLICATIONS

European Search Report dated May 8, 2015 issued in counterpart application No. 14198106.8-1870.

*Primary Examiner* — Duc Dinh
(74) *Attorney, Agent, or Firm* — The Farrell Law Firm, P.C.

(57) ABSTRACT

An electronic device and a control method for configuring a multi-vision screen using a relative position between electronic devices are provided. The control method includes interacting with at least one other electronic device, capturing a first image and receiving, from the at least one other electronic device, a second image captured by the at least one other electronic device, determining relative positions of the electronic device and the at least one other electronic device by comparing the first image with the second image, and configuring a multi-vision screen using the display of the electronic device and the display of the at least one other electronic device based on the determined relative positions and controlling output of a content image on the multi-vision screen.

10 Claims, 21 Drawing Sheets

(51) Int. Cl.
*G06T 7/00* (2006.01)
*H04N 1/387* (2006.01)
*H04W 4/02* (2009.01)
*H04W 4/00* (2009.01)

(52) U.S. Cl.
CPC ............ *H04N1/3876* (2013.01); *H04W 4/023* (2013.01); *G09G 2356/00* (2013.01); *G09G 2370/16* (2013.01); *G09G 2370/22* (2013.01); *H04W 4/008* (2013.01)

(56) References Cited

U.S. PATENT DOCUMENTS

| | | |
|---|---|---|
| 2006/0101150 A1 | 5/2006 | Cho et al. |
| 2010/0144283 A1* | 6/2010 | Curcio et al. ................. 455/66.1 |
| 2011/0086703 A1* | 4/2011 | Miller ............................. 463/31 |
| 2012/0206319 A1 | 8/2012 | Lucero et al. |
| 2013/0300885 A1* | 11/2013 | Huang et al. ............... 348/211.2 |
| 2014/0362995 A1* | 12/2014 | Backman et al. ............... 381/17 |

* cited by examiner

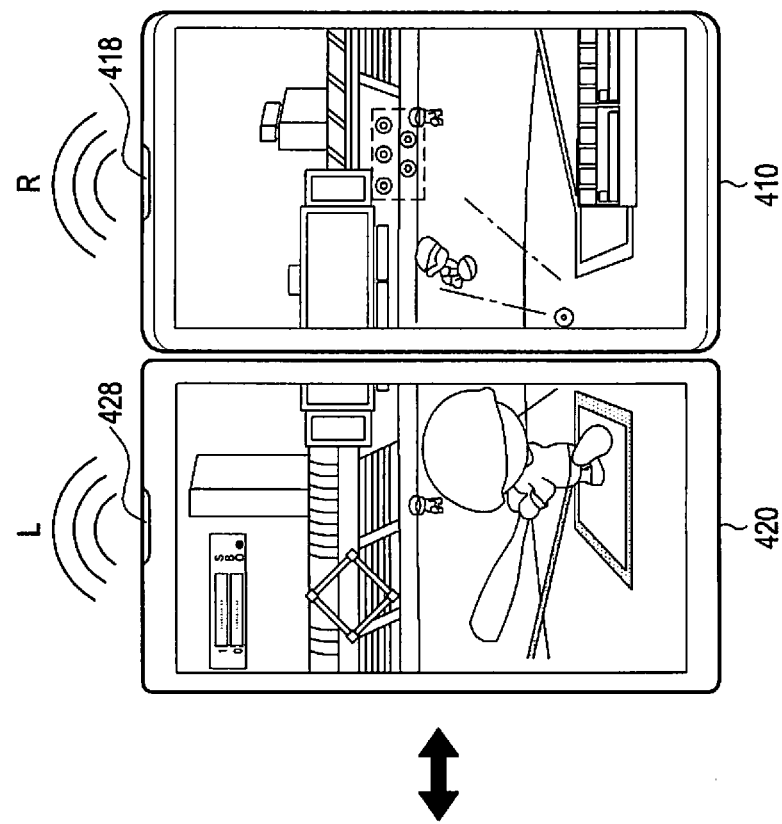
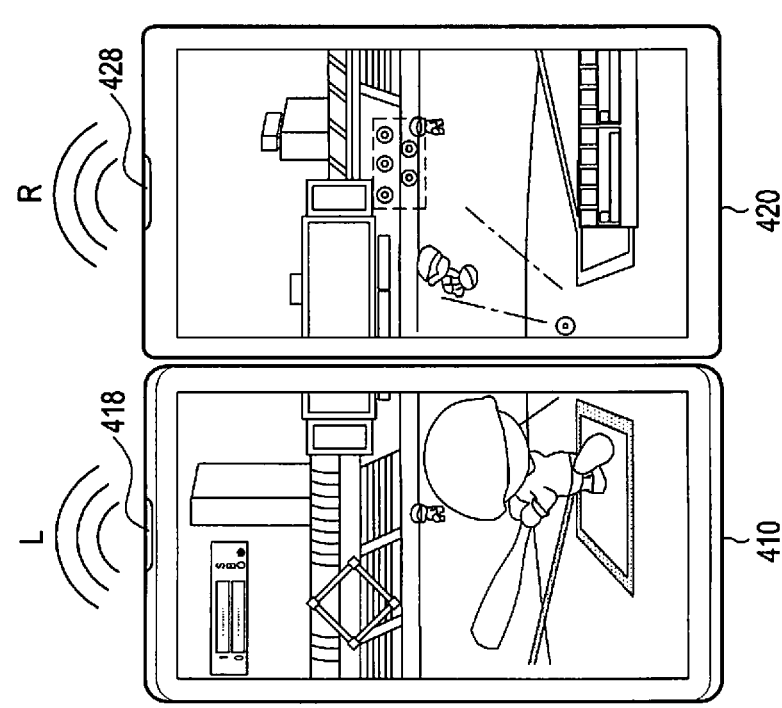
FIG.15A
FIG.15B

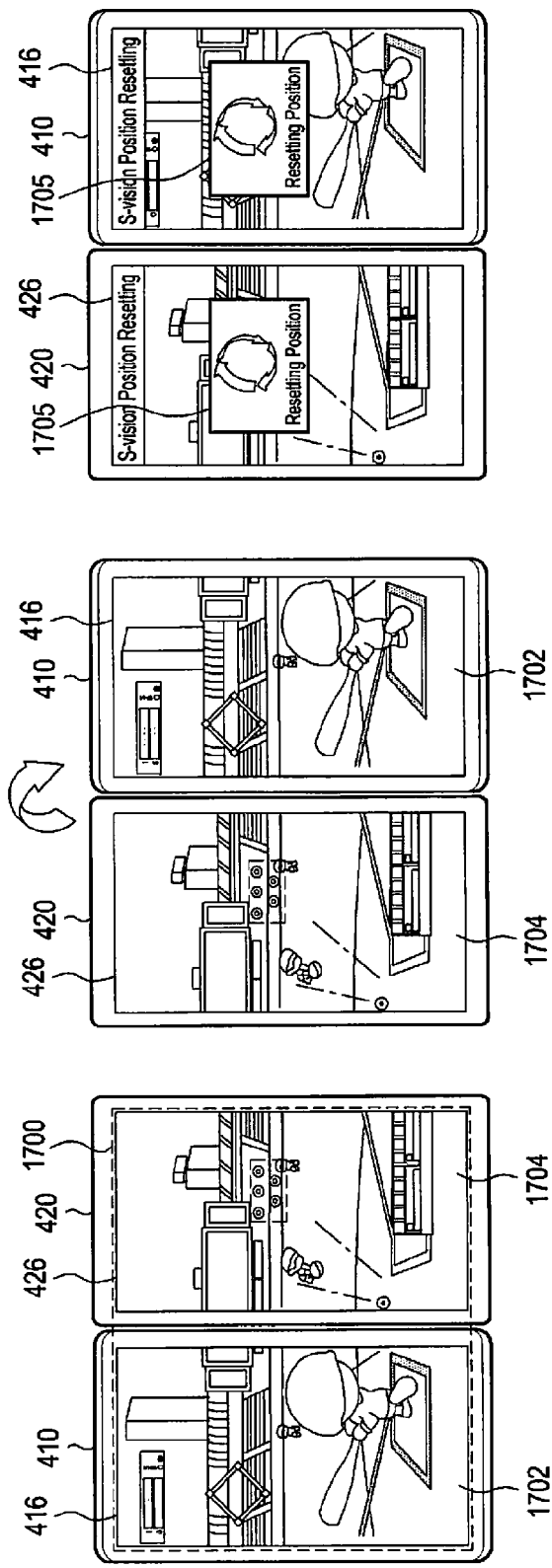

ELECTRONIC DEVICE AND CONTROL METHOD USING RELATIVE POSITION BETWEEN ELECTRONIC DEVICES IN THE ELECTRONIC DEVICE

PRIORITY

This application claims priority under 35 U.S.C. §119(a) to Korean Patent Application Serial No. 10-2013-0157438, which was filed in the Korean Intellectual Property Office on Dec. 17, 2013, the entire content of which is incorporated herein by reference.

BACKGROUND OF THE INVENTION

1. Field of Invention

The present disclosure relates to an electronic device and a control method using a relative position between electronic devices in the electronic device.

2. Description of Related Art

In the early development stage of electronic devices, a portable terminal such as a smartphone focused on an individual user's usability, based on a single application. In contrast, more recent portable terminals focus on usability based on network connection-based sharing. Network-based services of portable terminals range from data sharing between smart devices to information sharing over a network, such as Social Networking Service (SNS), cloud service, etc.

Along with the evolution of portable terminals, direct interaction between portable terminals has attracted much interest. This technique establishes a connection between portable terminals without intervention of a server, allows for the exchange of data between the portable terminals, and controls the interacting portable terminals. In terms of extending the usability of portable terminals, the interaction technique is very useful.

As the One Person Multi Device (OPMD) has become popular due to the proliferation of large-screen tablet Personal Computers (PCs), the development of technologies related to the interaction between terminals is very significant in terms of competitiveness. Currently, to couple the screens of two or more electronic devices into one screen and control the screens integrally, multi-vision technology is needed.

Today, to construct a multi-vision screen with the screens of two or more electronic devices, a user manually sets an area of the multi-vision screen for each of the screens, with the screens arranged in one screen for multi-vision in the related art. If a relative position of any of the plurality of electronic devices is changed, e.g., due to a variation in the position, displacement, or inclination of the electronic device after the multi-vision screen is constructed, an image output to the multi-vision screen should be readjusted. However, the relative position of the electronic device cannot be determined, which makes it impossible to readjust the image displayed on the multi-vision screen.

SUMMARY

An aspect of the present disclosure is to address at least the above-mentioned problems and/or disadvantages and to provide at least the advantages described below.

Accordingly, an aspect of the present disclosure is to provide an electronic device and a control method for configuring a multi-vision screen using a relative position between a plurality of electronic devices such that a multi-vision screen is automatically formed without a user input.

Another aspect of the present disclosure is to provide a an electronic device and a control method using a relative position between a plurality of electronic devices, in which if a relative position of any of a plurality of electronic devices is changed after a multi-vision screen is formed using the plurality of electronic devices, an image output on the multi-vision screen is automatically readjusted.

In accordance with an aspect of the present disclosure, a control method for configuring a multi-vision screen using a relative position in an electronic device is provided. The control method includes interacting with at least one other electronic device, capturing a first image and receiving, from the at least one other electronic device, a second image captured by the at least one other electronic device, determining relative positions of the electronic device and the at least one other electronic device by comparing the first image with the second image, and configuring a multi-vision screen using a display of the electronic device and a display of the at least one other electronic device based on the determined relative positions and controlling output of a content image on the multi-vision screen.

In accordance with another aspect of the present disclosure, an electronic device is provided. The electronic device includes a display, a camera for capturing a first image, a communication unit for communicating with at least one other electronic device, and a controller for capturing the first image through the camera, receiving, from the at least one other electronic device, a second image captured by the at least one other electronic device, determining relative positions of the electronic device and the at least one other electronic device by comparing the first image with the second image, configuring a multi-vision screen using a display of the electronic device and a display of the at least one other electronic device based on the determined relative positions, and controlling output of a content image on the multi-vision screen.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain embodiments of the present disclosure will be more apparent from the following detailed description taken in conjunction with the accompanying drawings, in which:

FIGS. 15A and 15B illustrate an example of outputting audio signals during output of a content image on a multi-vision screen according to various embodiments of the present invention;

FIGS. 17A-17C, 18, and 19 illustrate a method for determining a relative position change in two electronic devices according to various embodiments of the present invention;

Throughout the drawings, like reference numerals will be understood to refer to like parts, components, and structures.

DETAILED DESCRIPTION OF EMBODIMENTS OF THE PRESENT INVENTION

Figure 1:
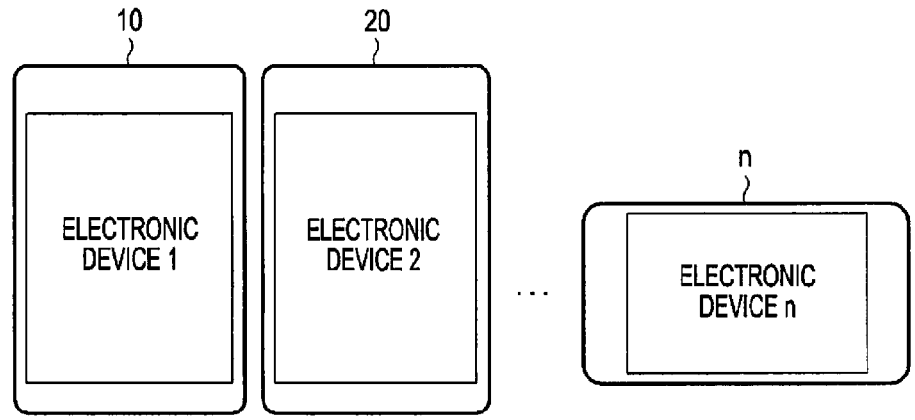
FIG. 1 illustrates a plurality of electronic devices according to an embodiment of the present invention.

The following description with reference to the accompanying drawings is provided to assist in a comprehensive understanding of embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions be omitted for clarity and conciseness.

The terms and words used in the following description and claims are not limited to the bibliographical meanings, but, are merely used to enable a clear and consistent understanding of the disclosure. Accordingly, it should be apparent to those skilled in the art that the following description of embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, occur in amounts that do not preclude the effect the characteristic was intended to provide.

An electronic device according to an embodiment of the present disclosure is a device that has communication capabilities and interacts with another device by communication. For example, the electronic device may be one or a combination of two or more of various devices, such as a smartphone, a tablet Personal Computer (PC), a mobile phone, a video phone, an e-Book reader, a desktop PC, a laptop PC, a Netbook computer, a Personal Digital Assistant (PDA), a Portable Multimedia Player (PMP), an MP3 player, mobile medical equipment, a camera, a wearable device (for example, a Head-Mounted Display (HMD) (e.g. electronic glasses), electronic clothing, an electronic bracelet, an electronic necklace, an electronic Appcessory, or a smart watch), and the like. It will be apparent to those of ordinary skill in the art that the electronic device according to an embodiment of the present disclosure is not limited to the aforementioned devices.

With reference to the attached drawings, various embodiments of the present disclosure will be described in detail, which should not be construed as limiting the scope of the present disclosure. In the drawings, like reference numerals denote the same components having substantially the same function.

FIG. 1 illustrates a plurality of electronic devices according to an embodiment of the present invention.

Referring to FIG. 1, a plurality of electronic devices 10, 20, . . . , n each have a display screen and configure a multi-vision screen with their display screens by interacting with one another by communication. In one embodiment of the present disclosure, two electronic devices configure one multi-vision screen using the display screens of the two electronic devices by interacting with each other by communication. In another embodiment of the present invention, three electronic devices configure one multi-vision screen using the display screens of the three electronic devices by interacting with each other by communication. The number of electronic devices that interact with each other is not limited. The plurality of electronic devices 10, 20, . . . , n interact with one another in various communication schemes such as short-range communication, mobile communication, and the like.

In various embodiments of the present invention, when a multi-vision screen is configured using the plurality of electronic devices 10, 20, . . . , n, the relative positions of the plurality of electronic devices 10, 20, . . . , n are determined, a multi-vision screen is configured based on the determined relative positions, and an output of a content image on the multi-vision screen is controlled. Further, if any of the plurality of electronic devices 10, 20, . . . , n has a changed relative position after the multi-vision screen is configured, the multi-vision screen is reconfigured and readjustment of the content image to be output to the reconfigured multi-vision screen is controlled. The plurality of electronic devices 10, 20, . . . , n is configured independently. The content image may include a photo, a video, music, text, an image, and the like.

Figure 2:
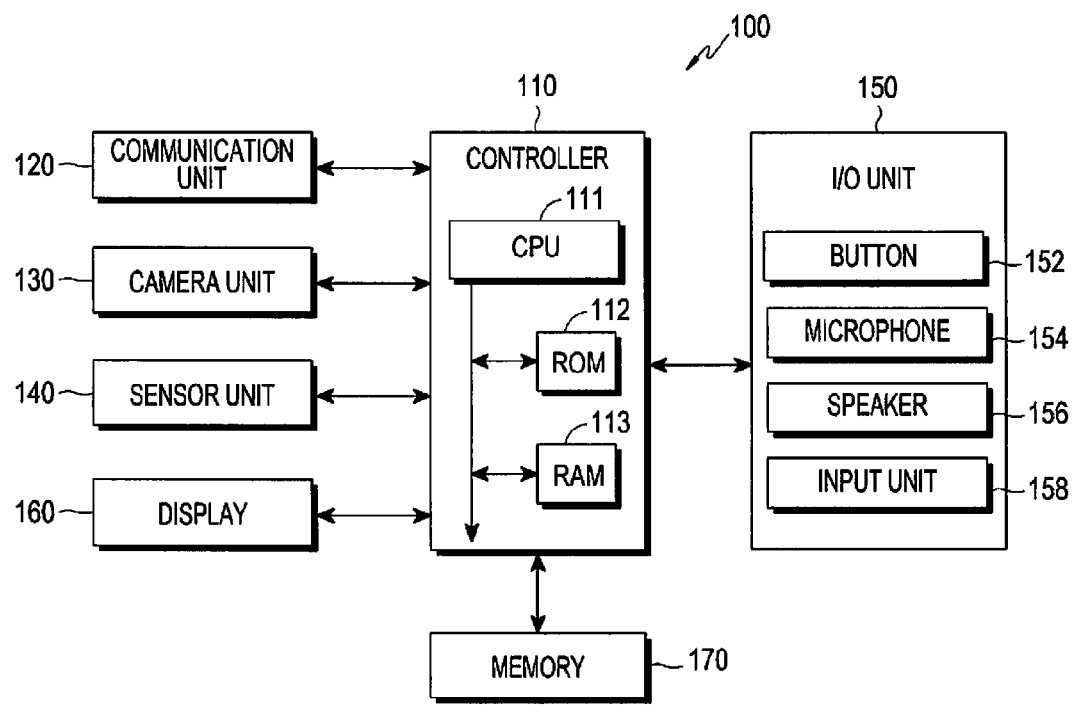
FIG. 2 is a block diagram of an electronic device according to an embodiment of the present invention.

FIG. 2 is a block diagram of an electronic device according to an embodiment of the present invention.

Referring to FIG. 2, an electronic device 100 includes a controller 110, a communication unit 120, a camera unit 130, a sensor unit 140, an Input/Output (I/O) unit 150, a display 160, and a memory 170.

The controller 110 controls the communication unit 120, the camera unit 130, the sensor unit 140, the I/O unit 150, the display 160, and the memory 170. In other words, the controller 110 provides overall control to the electronic device 100. The controller 110 controls a signal flow between the components.

For example, the controller 110 enters an interaction mode and exchanges device information with at least one other electronic device. The device information about an electronic device includes display size information, resolution information, detailed component information, and user information about the electronic device. In the interaction mode, the controller 110 acquires sensing information obtained by the sensor unit 140 and sensing information obtained by the at least one other electronic device and also acquires a front and/or rear image captured by the camera unit 130 and a front and/or rear image captured by the at least one other electronic device. The controller 110 determines the relative positions of the electronic device 100 and the at least one other electronic device using the front and rear images captured by the camera unit 130 and the front and rear images captured by the at least one other electronic device. In determining the relative positions of the electronic device 100 and the at least one other electronic device, the controller 110 uses the front images or the rear images. An image captured by the electronic device 100 is defined as a first image and an image captured by the at least one other electronic device is defined as a second image. The relative positions includes a direction in which the at least one other electronic device is located with respect to the electronic device 100 or the distance between the at least one other electronic device and the electronic device 100. For example, the controller 110 determines in what direction and how far the at least one other device is located with respect to the electronic device 100, based on the direction or distance of the at least one other electronic device.

Further, the controller 110, using sensing information acquired by the sensor unit 140, determines information about rotation of the at least one other electronic device with respect to a horizontal direction, or determines information about inclination of the at least one other electronic device with respect to a gravity direction. For example, sensing information acquired from the electronic device is first sensing information and sensing information acquired from the at least one other electronic device is second sensing information. For example, the electronic device 100 determines how much each of the electronic device 100 and the at least one other electronic device have been rotated with respect to the horizontal direction or how much each of the electronic device 100 and the at least one other electronic device are inclined with respect to the gravity direction. The controller 110 configures a multi-vision screen using the display screens of the electronic device 100 and the at least one other electronic device according to the relative positions of the electronic device 100 and the at least one other electronic device and controls output of a content image to the multi-vision screen. If any of the first sensing information and the second sensing information is changed while content is being output to the multi-vision screen, the controller 110 re-determines the relative positions of the electronic device 100 and the at least one other electronic device. The controller 110 then reconfigures the multi-vision screen according to the re-determined relative positions of the electronic device 100 and the at least one other electronic device and controls output of content to the reconfigured multi-vision screen.

The communication unit 120 connects the electronic device 100 to the at least one other electronic device. The electronic device 100 interacts with the at least one other electronic device by short-range communication, mobile communication, or any other communication scheme through the communication unit 120 and receives or exchanges sensing information and a front or rear image from or with the at least one other electronic device. Further, the communication unit 120 provides content of the electronic device 100 to the at least one other electronic device. The short-range communication conforms to at least one of WiFi, Bluetooth, and Zigbee. The mobile communication conforms to at least one of 3rd Generation (3G) communication, $4^{th}$ Generation (4G) communication, and Long Term Evolution (LTE) direct.

The camera unit 130 includes at least one of a first camera (not shown) and a second camera (not shown) for capturing a still image or a video under the control of the controller 110. The first camera is disposed on a front surface of the electronic device 100, and the second camera is disposed on a rear surface of the electronic device 100. When the electronic device 100 enters the interaction mode with the at least one other electronic device, the camera unit 130 captures a front image through the first camera and a rear image through the second camera under the control of the controller 110. Both or one of the front and rear images is captured.

The sensor unit 140 includes an acceleration sensor, a gravity sensor, an inertial sensor, and a geomagnetic sensor. The electronic device 100 determines the direction of the at least one other electronic device with respect to the electronic device, the distance between the electronic device 100 and the at least one other electronic device, the rotation of the at least one other electronic device with respect to the horizontal direction, or the inclination of the at least one other electronic device with respect to the gravity direction, using sensor values sensed by the acceleration sensor, the gravity sensor, the inertial sensor, and the geomagnetic sensor. In addition to the acceleration sensor, the gravity sensor, the inertial sensor, and the geomagnetic sensor, the sensor unit 140 may include any sensor as far as the sensor is needed to determine the relative positions of the electronic device 100 and the at least one other electronic device.

The I/O unit 150 includes a button 152, a microphone 154, a speaker 156, and an input unit 158. The I/O unit 150 is not be limited to these components and may provide cursor control for communication with the controller 110 and for control of cursor movement on the display 160 by a mouse, a trackball, a joystick, or cursor directional keys. One or more buttons 152 are included in the electronic device 100 and provide various input signals to the controller 110, when pressed by a user. For the input of voices or sounds from various sound sources, the microphone 154 generates electrical signals. The speaker 156 externally outputs sounds corresponding to various signals (for example, a wireless signal, a broadcasting signal, a digital audio file, a digital video file, and the like), along with sounds corresponding to the execution of applications under the control of the controller. The input unit 158 is a device or object which is separately configured or which is configured to be inserted and kept inside the electronic device 100. The input unit 158 is a user finger or an input means capable of making an input by its proximity to the display 160 or by touching the display 160.

The display 160 is a touch screen and provides various Graphical User Interfaces (GUIs) to a user. For example, the display 160 receives a gesture input including at least one of a proximity-based input or a touch input through a user's body (for example, a finger) or through the input unit 158, such as a pen. The display 160 may be implemented, for example, as a resistive type, a capacitive type, an infrared type, a surface acoustic wave type, and the like. According to an embodiment of the present disclosure, the display 160 is a part of a multi-vision screen under the control of the controller 110 and outputs a part of a content image displayed on the multi-vision screen under the control of the controller 110.

The memory 170 stores input/output signals or data in accordance with steps of the controller 110, the communication unit 120, the camera unit 130, the sensor unit 140, the I/O unit 150, the display 160, and the memory 170 under the control of the controller 110. The memory 170 stores a plurality of programs and a plurality of applications to control the electronic device 100 or the controller 110, that is, programs for executing functions, and data.

The term "memory" covers a Read Only Memory (ROM) 112 and a Random Access Memory (RAM) 113 within the controller 110, or a memory card (not shown) (for example, a Secure Digital (SD) card or a memory stick) mounted to the electronic device 100. The memory 170 may include a non-volatile memory, a volatile memory, a Hard Disk Drive (HDD), or a Solid State Drive (SSD).

The memory 170 is a machine-readable medium (for example, a computer-readable medium). A machine-readable medium refers to a medium that provides data to a machine so that the machine may execute a specific function. The machine-readable medium may be a storage medium. The memory 170 includes a non-volatile medium and a volatile medium. All these media should be of types that output commands detectable by a physical device that reads the commands to a machine. The machine-readable medium may include, but not limited to, at least one of a floppy disk, a hard disk, a magnetic tape, a Compact Disc Read Only Memory (CD-ROM), a punch card, a paper tape, a RAM, a Programmable Read Only Memory (PROM), an Erasable PROM (EPROM), and a Flash EPROM.

Figure 3:
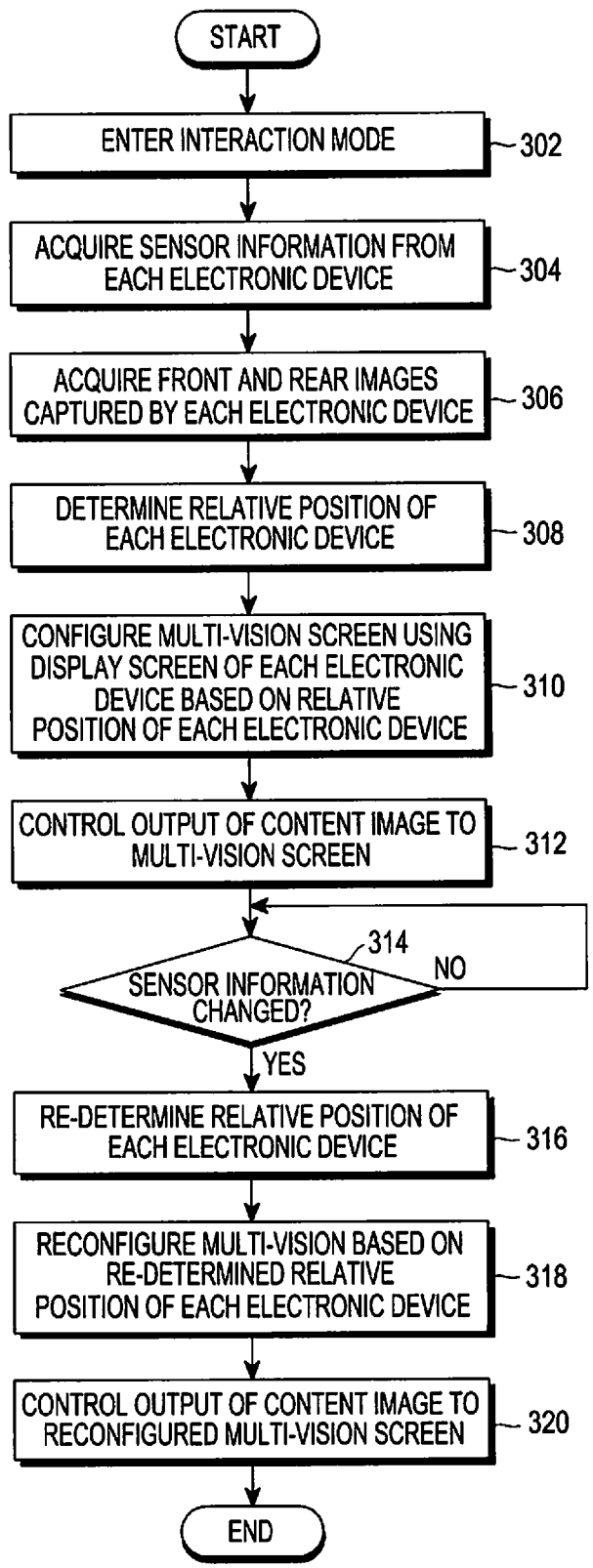
FIG. 3 is a flowchart illustrating a control step for outputting a content image in an electronic device, based on a relative position between electronic devices, according to an embodiment of the present invention.

FIG. 3 is a flowchart illustrating a control step for outputting a content image in an electronic device, based on a relative position between electronic devices, according to an embodiment of the present invention.

Referring to FIG. 3, the electronic device 100 enters an interaction mode to interact with at least one other electronic device (not shown) in step 302. In the interaction mode, the electronic device 100 interacts with the at least one other electronic device by communication and exchanges device information with the at least one other electronic device. Device information about an electronic device includes display size information, resolution information, detailed component information, and user information about the electronic device.

In step 304, the electronic device 100 acquires sensing information from electronic devices, for example, sensing information about the electronic device 100 and sensing information from each of the at least one other electronic device. For example, the electronic device 100 acquires its sensing information through the sensor unit 140 and receives sensing information from the at least one other electronic device. The sensing information includes values sensed by an acceleration sensor, a gravity sensor, an inertial sensor, and a geomagnetic sensor.

In step 306, the electronic device 100 acquires front and rear images captured by the electronic devices, for example, the electronic device 100 and each of the at least one other electronic device. For example, the electronic device 100 acquires a front image captured by the first camera and a rear image captured by the second camera and receives front and rear images from the at least one other electronic device. Alternatively, the electronic device 100 may acquire either the front images or the rear images captured by the electronic device 100 and each of the at least one other electronic device.

In step 308, the electronic device 100 determines relative positions of the electronic devices. That is, the relative positions of the electronic device 100 and the at least one other electronic device. For example, the electronic device 100 determines relative positions of the electronic device 100 and each of the at least one other electronic device using the front and rear images of the electronic device 100 and the at least one other electronic device. In determining the relative positions of the electronic device 100 and the at least one other electronic device, the electronic device 100 uses the front images or rear images of the electronic device 100 and each of the at least one other electronic device. For example, the relative positions includes a direction of the at least one other electronic device with respect to the electronic device 100 or the distance between the at least one other electronic device and the electronic device 100. Further, the electronic device 100 determines a rotation degree of each of the at least one other electronic device with respect to a horizontal direction or determines an inclination of each of the at least one other electronic device with respect to a gravity direction, using the sensing information acquired by the sensor unit 140 and the sensing information received from each of the at least one other electronic device. For example, the electronic device 100 determines how far and in what direction each of the at least one other electronic device is located with respect to the electronic device 100, how much each of the at least one other electronic device has been rotated with respect to the horizontal direction, or how inclined each of the at least one other electronic device is with respect to the gravity direction.

In step 310, the electronic device 100 configures a multi-vision screen using the display screens of the electronic device 100 and each of the at least one other electronic device based on the relative positions of the electronic devices, that is, the relative positions of the electronic device 100 and the at least one other electronic device. The electronic device 100 controls output of content to the multi-vision screen in step 312.

While the content is being output to the multi-vision screen, the electronic device 100 determines whether at least one of the sensing information acquired by the sensor unit 140 and the sensing information received from the at least one other electronic device has been changed in step 314.

If the sensing information has been changed, the electronic device 100 re-determines the relative positions of the electronic device 100 and the at least one other electronic device in step 316. If the sensing information has not changed, the electronic device 100 waits for a change of the sensing information.

In step 318, the electronic device 100 reconfigures the multi-vision screen based on the re-determined relative positions of the electronic device 100 and the at least one other electronic device. The electronic device 100 controls output of content to the reconfigured multi-vision screen in step 320.

In various embodiments of the present disclosure, two electronic devices interact with each other by communication and a multi-vision screen is configured using the display screens of the two electronic devices based on a relative position between the electronic devices.

Figure 4:
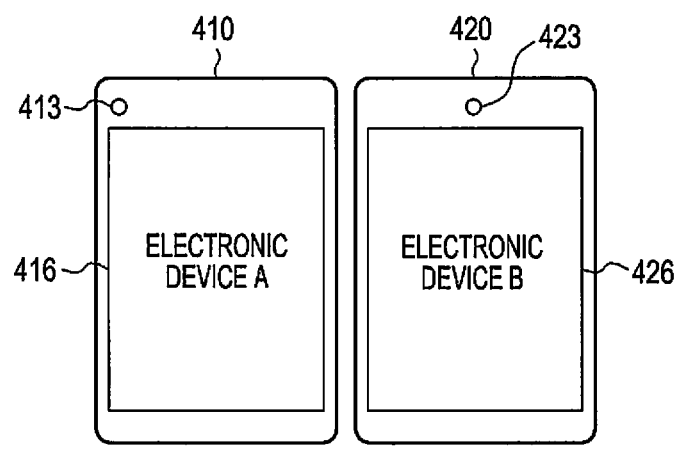
FIG. 4 illustrates two electronic devices used in the configuration of a multi-vision screen according to an embodiment of the present invention.

FIG. 4 illustrates two electronic devices used in the configuration of a multi-vision screen according to an embodiment of the present invention.

Referring to FIG. 4, two electronic devices, for example, an electronic device A 410 and an electronic device B 420 interact with each other. One of electronic device A 410 and electronic device B 420 acts as a host, determines the relative positions of electronic device A 410 and electronic device B 420, and configures a multi-vision screen using a display 416 of electronic device A 410 and a display 426 of electronic device B 420, based on the relative positions of the electronic devices.

For example, electronic device A 410 acts as a host, determines the relative positions of electronic device A 410 and electronic device B 420, and configures a multi-vision screen using the display 416 of electronic device A 410 and the display 426 of electronic device B 420, based on the relative positions of the electronic devices. Likewise, electronic device B 420 may act as the host and determine the relative positions of electronic device A 410 and electronic device B 420, and configure a multi-vision screen using the display 416 of electronic device A 410 and the display 426 of electronic device B 420, based on the relative positions of the electronic devices. In an embodiment of the present invention, electronic device A 410 acts as a host, by way of example.

Figure 5:
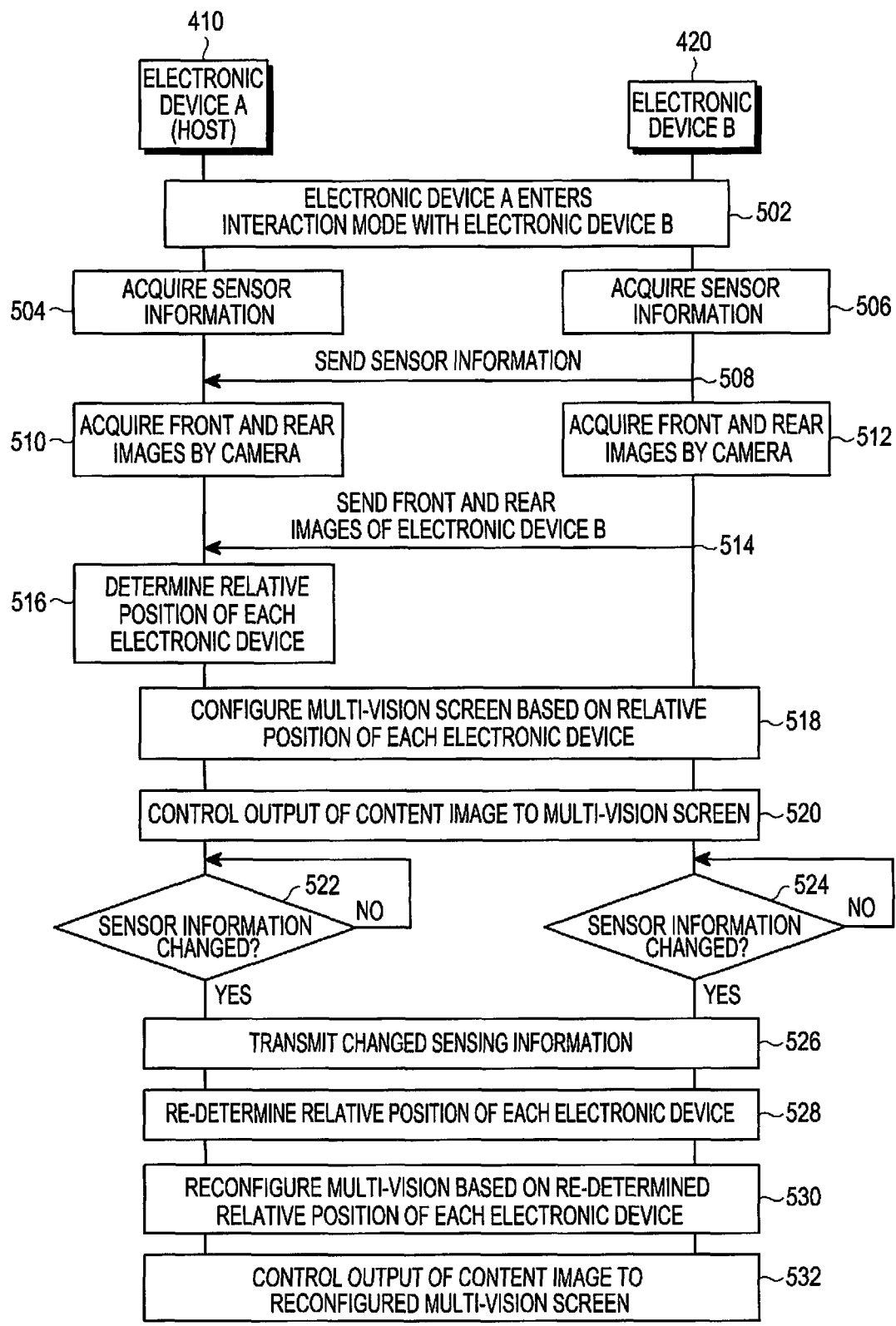
FIG. 5 is a flowchart illustrating a method for controlling output of a content image to a multi-vision screen, based on the relative positions of two electronic devices, according to an embodiment of the present invention.

FIG. 5 is a flowchart illustrating a method for controlling output of a content image to a multi-vision screen, based on the relative positions of two electronic devices, according to an embodiment of the present invention.

Referring to FIG. 5, electronic device A 410 enters the interaction mode with electronic device B 420 in step 502 In the interaction mode, electronic device A 410 interacts with electronic device B 420 by communication and exchanges device information with electronic device B 420. The device information about electronic device A 410 or electronic device B 420 includes display size information, resolution information, detailed component information, and user information.

In steps 504 and 506, each of electronic device A 410 and electronic device B 420 acquires sensing information. For example, each of electronic device A 410 and electronic device B 420 acquires sensing information by its sensor unit. The sensing information includes values sensed by an acceleration sensor, a gravity sensor, an inertial sensor, and a geomagnetic sensor. Electronic device A 410 receives sensing information from electronic device B 420 through a communication unit in step 508.

In steps 510 and 512, each of electronic device A and electronic device B acquires front and rear images captured by a camera. For example, each of electronic device A and electronic device B acquires a front image captured by a first camera and a rear image captured by a second camera. Alternatively, either one of the front or rear images may be captured. In step 514, electronic device A 410 receives the front and rear images captured by electronic device B 420. Again, as an alternative, one of the front or rear images may be received.

In step 516, electronic device A 410 determines the relative positions of electronic device A 410 and electronic device B 420 using the front or rear images of electronic device A 410 and electronic device B 420. For example, the relative positions include a direction of electronic device B 420 with respect to electronic device A 410 or the distance between electronic device A 410 and electronic device B 420. Thus electronic device A 410 determines how far and in what direction electronic device B 420 is located with respect to electronic device A 410, based on the direction or distance of electronic device B 420.

Further, electronic device A 410 determines a rotation degree of electronic device B 420 with respect to a horizontal direction or an inclination of electronic device B 420 with respect to a gravity direction, using the sensing information of electronic device A 410 and electronic device B 420. For example, electronic device A 410 determines how much electronic device B 420 has been rotated with respect to the horizontal direction or how inclined electronic device B 420 is with respect to the gravity direction, based on the rotation information or inclination information about electronic device B 420.

In step 518, electronic device A 410 configures a multi-vision screen using the display screens of electronic device A 410 and electronic device B 420 based on the relative positions of electronic device A 410 and electronic device B 420.

Electronic device A 410 controls output of content to the multi-vision screen in step 520. For example, a part of the content image is displayed on a display of electronic device A 410 and the remaining part of the content image is displayed on a display of electronic device B 420.

While the content is being output to the multi-vision screen, in steps 522 and 524, each of electronic device A 410 and electronic device B 420 determines whether at least one of the sensing information of electronic device A 410 and the sensing information of electronic device B 420 has been changed. For example, each of electronic device A 410 and electronic device B 420 determines whether any of values sensed by the acceleration sensor, the gravity sensor, the inertial sensor, and the geomagnetic sensor has been changed. If the sensing information of electronic device B 420 has been changed, electronic device B 420 transmits the changed sensing information to electronic device A 410 in step 526.

In step 528, electronic device A 410 re-determines the relative positions of electronic device A 410 and electronic device B 420.

Figure 6A:
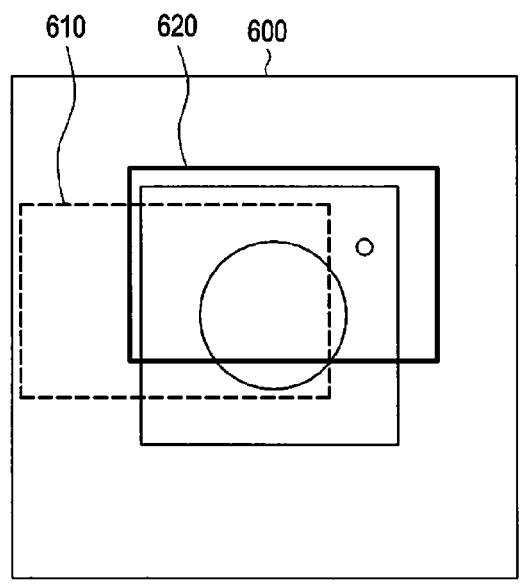
FIGS. 6A, 6B and 6C illustrate exemplary images captured by two electronic devices according to an embodiment of the present invention.
Figure 6B:
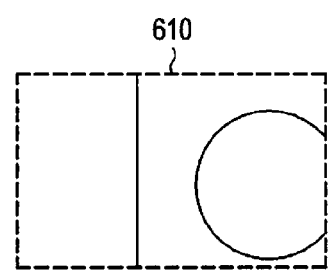
Figure 6C:
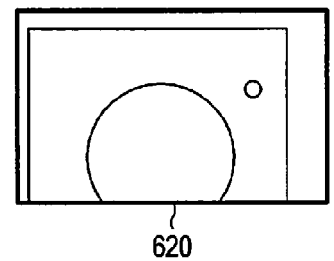

In step 530, electronic device A 410 reconfigures the multi-vision screen based on the re-determined relative positions of electronic device A 410 and electronic device B 420. Electronic device A 410 controls output of content to the reconfigured multi-vision screen in step 532. FIGS. 6A, 6B and 6C illustrate exemplary images captured by two electronic devices according to an embodiment of the present invention.

Referring to FIGS. 6A, 6B and 6C, the relative positions of electronic device A 410 and electronic device B 420 are determined using front or rear images of electronic device A 410 and electronic device B 420. In an embodiment of the present invention, the relative positions are determined using the front images, by way of example. For example, with electronic device A 410 and electronic device B 420 placed on the same plane, if each of electronic device A 410 and electronic device B 420 captures a front image by a front camera, for example, an object 600 (for example, a ceiling), as shown in FIG. 6A, then first image 610 and second images 620 captured by electronic device A 410 and electronic device B 420, respectively, may be different because electronic device A 410 and electronic device B 410 are at different positions. For example, electronic device A 410 captures the first image 610 as shown in FIG. 6B, whereas electronic device B 420 captures the second image 620, as shown in FIG. 6C.

In an embodiment of the present disclosure, feature points are extracted from the first image 610 and the second image 620 and compared. Then the relative positions of electronic device A 410 and electronic device B 420 are determined based on the comparison.

FIGS. 7A, 7B, 8A and 8B illustrate examples of extracting feature points from images captured by a plurality of electronic devices according to an embodiment of the present invention.

Figure 7A:
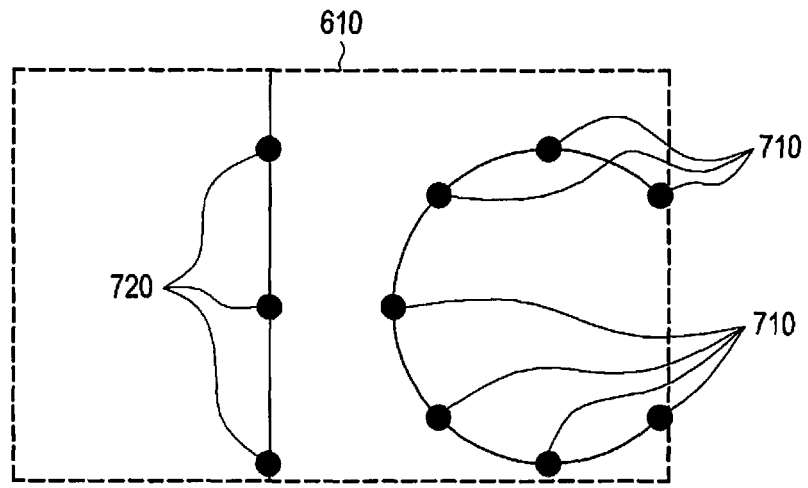
FIGS. 7A, 7B, 8A and 8B illustrate examples of extracting feature points from images captured by two electronic devices according to an embodiment of the present invention.
Figure 7B:
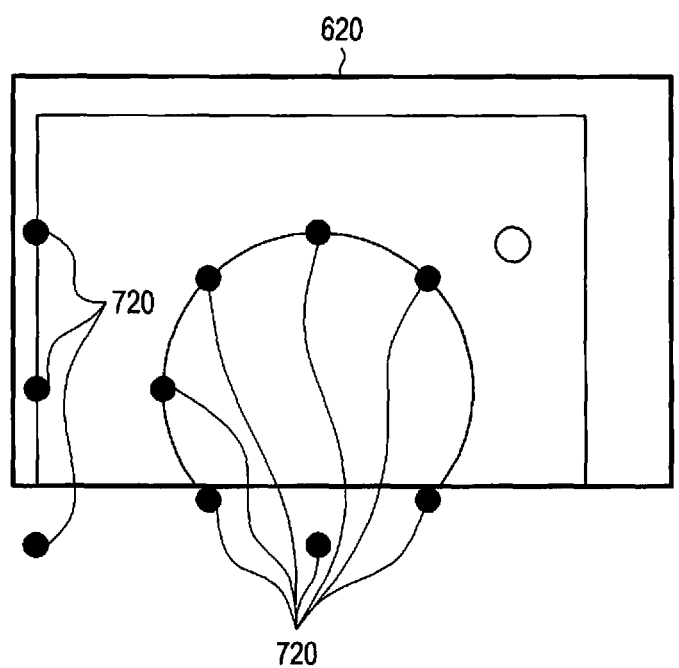

Referring to FIGS. 7A and 7B, electronic device A 410 extracts feature points 710 from a first image 610 captured by electronic device A 410, as shown in FIG. 6A and feature points 720 from a second image 620 captured by electronic device B 420, as shown in FIG. 6B.

Figure 8A:
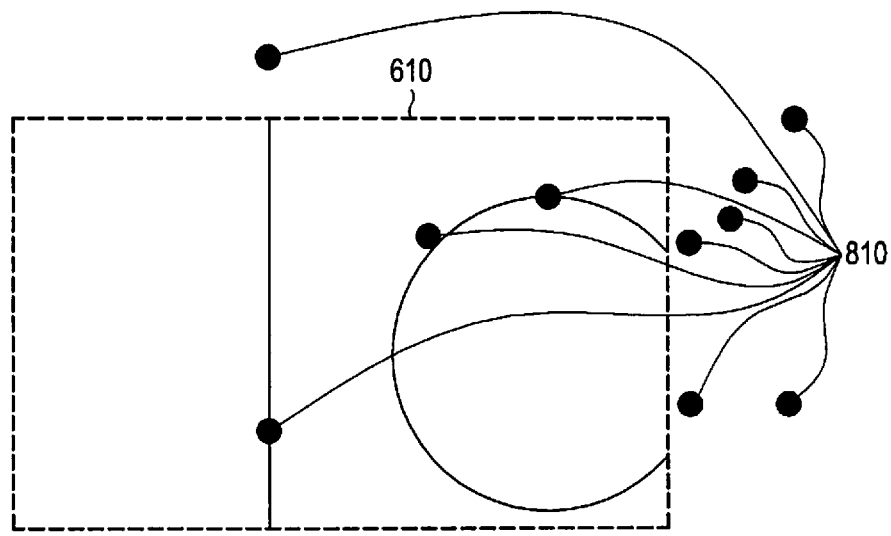
Figure 8B:
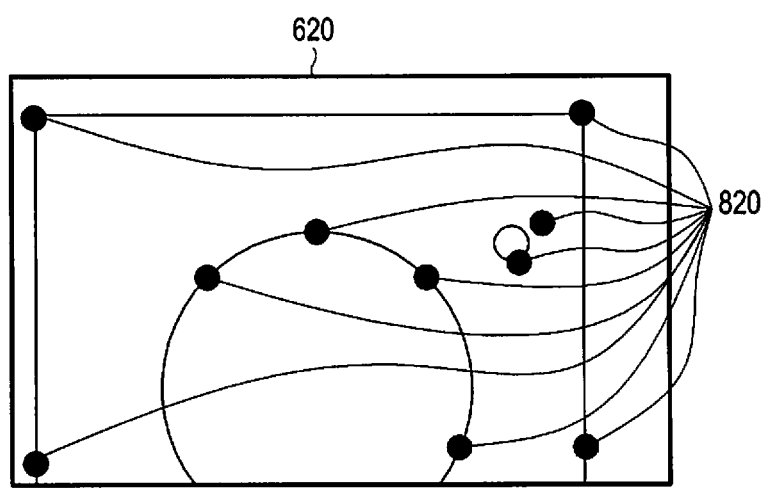

Referring to FIGS. 8A and 8B, electronic device B 420 extracts feature points 810 from the first image 610 captured by electronic device A 410, as shown in FIG. 6A and feature points 820 from the second image 620 captured by electronic device B 420, as illustrated in FIG. 6B.

Figure 9C:
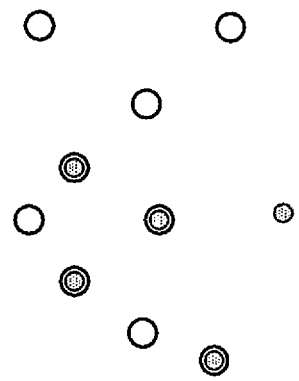
FIGS. 9A, 9B and 9C illustrate a comparison of feature points extracted from images captured by two electronic devices according to an embodiment of the present invention.
Figure 9B:
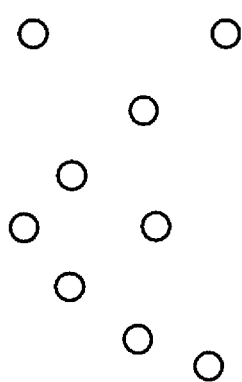
Figure 9A:
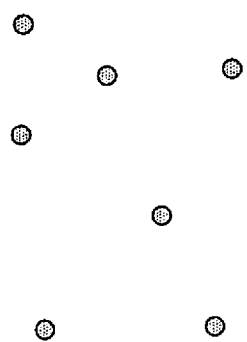

FIGS. 9A, 9B and 9C illustrate a comparison of feature points extracted from images captured by two electronic devices according to an embodiment of the present invention.

FIG. 9A illustrates feature points extracted from the first image 610 and FIG. 9B illustrates feature points extracted from the second image 620. Electronic device A 410 determines relative positions of electronic device A 410 and electronic device B 420 by comparing the pattern of the feature points extracted from the first image 610 with the pattern of the feature points extracted from the second image 620, as shown in FIG. 9C.

Specifically, electronic device A 410 acquires the pattern of the feature points of the first image 610 and determine whether there is any feature point of the second image 620 matching to a feature point of the first image 610 by comparing the feature point pattern of the first image 610 with the feature point pattern of the second image 620. Electronic device A 410 also acquires the pattern of the feature points of the second image 620 and determine whether there is any feature point of the first image 610 matching to a feature point of the second image 620 by comparing the feature point pattern of the second image 620 with the feature point pattern of the first image 610. Then electronic device A 410 determines the relative positions of electronic device A 410 and electronic device B 420.

In another embodiment of the present disclosure, electronic device A 410 extracts a feature point pattern from the first image 610, extracts a feature point pattern from the second image 620, and compares the two feature point patterns, thereby determining the relative positions of electronic device A 410 and electronic device B 420.

In the above-described method for determining the relative positions of two electronic devices using images captured by the two electronic devices, electronic device A 410 determines a direction of electronic device B 420 with respect to electronic device A 410 or the distance between electronic device A 410 and electronic device B 420.

In an embodiment of the present disclosure, each of electronic device A 410 and electronic device B 420 indicates on a screen, that a relative position is being determined. Then a multi-vision screen is configured based on the relative positions of electronic device A 410 and electronic device B 420.

Figure 10:
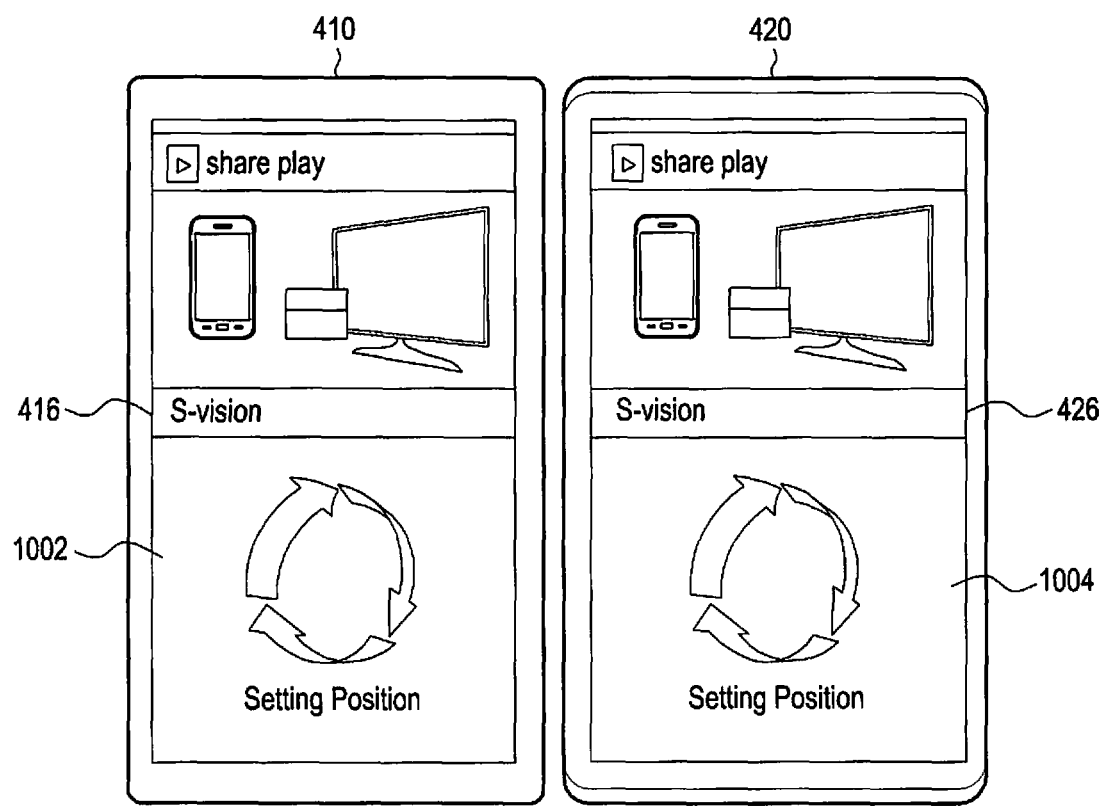
FIG. 10 illustrates an example of two electronic devices indicating that a relative position is being determined to form a multi-vision screen on screens of the electronic devices according to an embodiment of the present invention.

FIG. 10 illustrates an example of two electronic devices indicating that a relative position is being determined to form a multi-vision screen on screens of the electronic devices according to an embodiment of the present invention.

Referring to FIG. 10, electronic device A 410 and electronic device B 420 display screens 1002 and 1003, respectively, indicating that a relative position is being determined for multi-vision on their displays 416 and 426, respectively. Upon completion of the relative position determination, electronic device A 410 and electronic device B 420 configure a multi-vision screen based on their relative positions and display content on the multi-vision screen in various manners.

FIGS. 11, 12A, 12B, 13A, 13B, 14A and 14B illustrate multi-vision screens according to various embodiments of the present invention.

Figure 11:
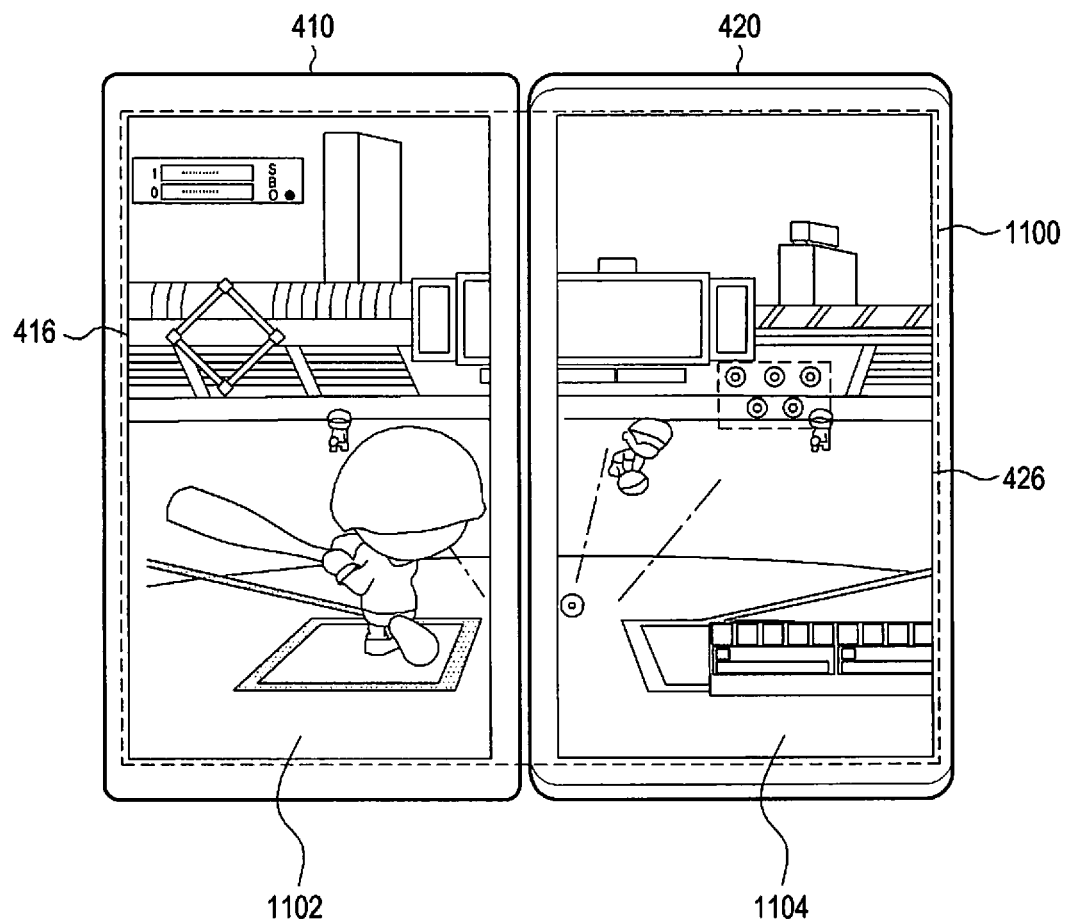
FIGS. 11, 12A, 12B, 13A, 13B, 14A and 14B illustrate multi-vision screens according to various embodiments of the present invention.

In FIG. 11, electronic device A 410 and electronic device B 420 have screens of the same size and are disposed horizontally and in parallel with each other.

Referring to FIG. 11, electronic device A 410 and electronic device B 420 configure a multi-vision screen 1100 in a horizontal direction using display 416 and display 426 of electronic device A 410 and electronic device B 420 and display a content image on the multi-vision screen 1100. For example, a part of the content image 1102 is displayed on the display 416 of electronic device A 410, while the other part of the content image 1104 is displayed on the display 426 of electronic device B 420. Or the same content image may be displayed on the displays 416 and 426 of electronic device A 410 and electronic device B 420.

Figure 12A:
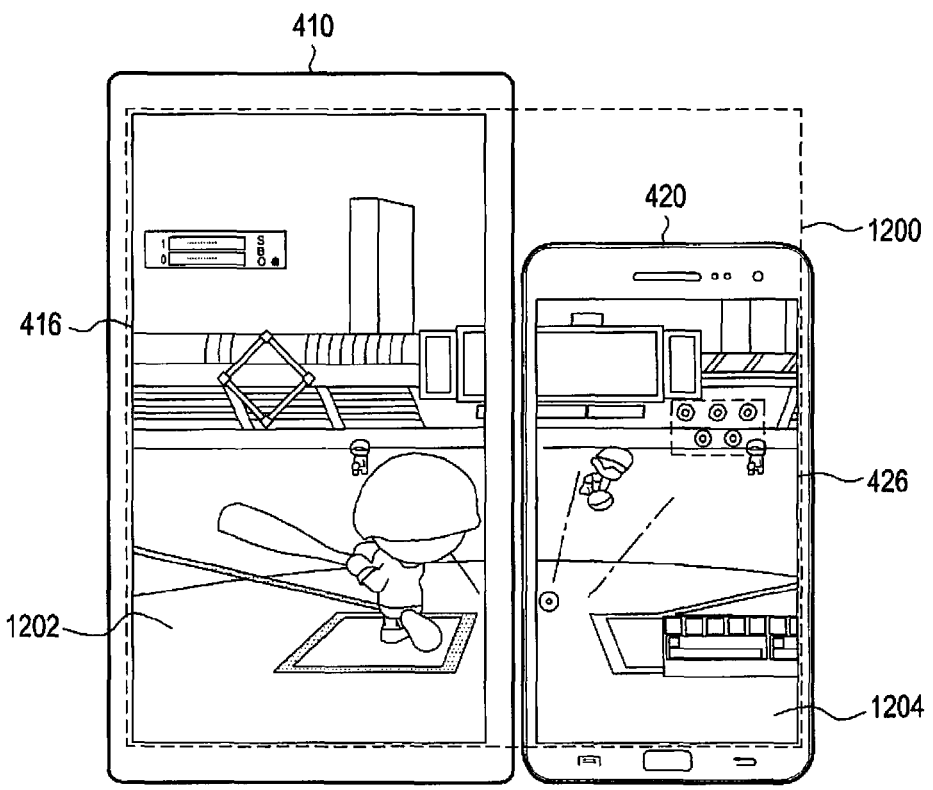
Figure 12B:
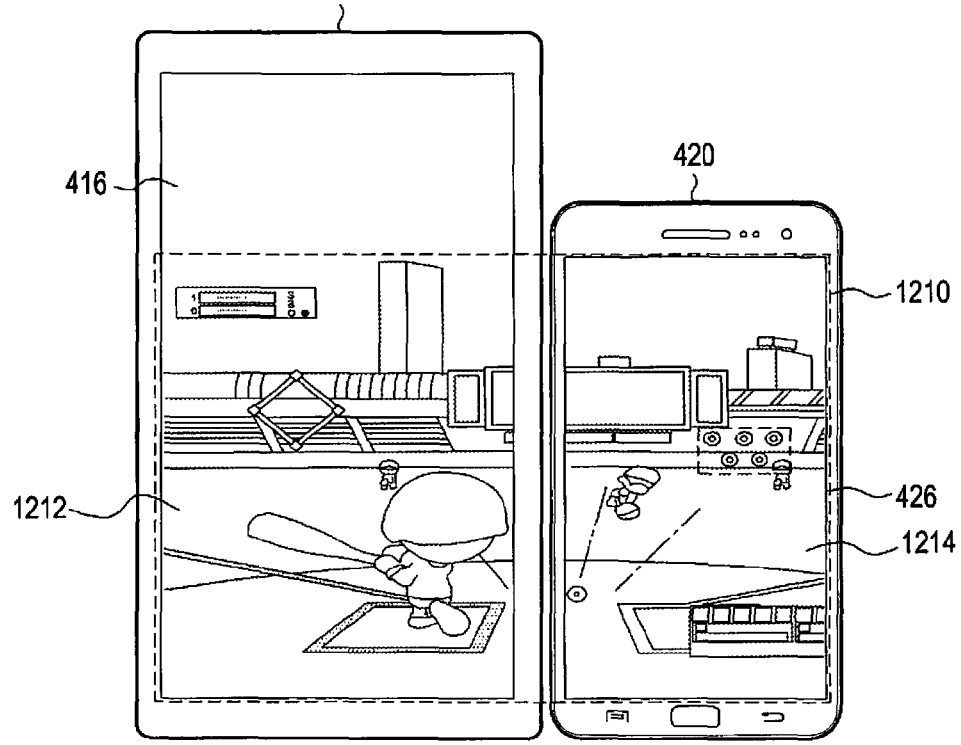

In FIGS. 12A and 12B, an electronic device A 410 and electronic device B 420 have the display 416 and the display 426 of different screen sizes and are arranged horizontally and in parallel with each other.

Referring to FIG. 12A, in the case where the display 416 and the display 426 of electronic device A 410 and electronic device B 420, respectively, are of different screen sizes, electronic device A 410 and electronic device B 420 configure a multi-vision screen 1200 in a horizontal direction with respect to the larger screen size, that is, with respect to the screen size of the display 416.

Referring to FIG. 12B, in the case where the display 416 and the display 426 of electronic device A 410 and electronic device B 420, respectively, are of different screen sizes, electronic device A 410 and electronic device B 420 configure a multi-vision screen 1210 in a horizontal direction with respect to the smaller screen size, that is, with respect to the screen size of the display 426.

Figure 13A:
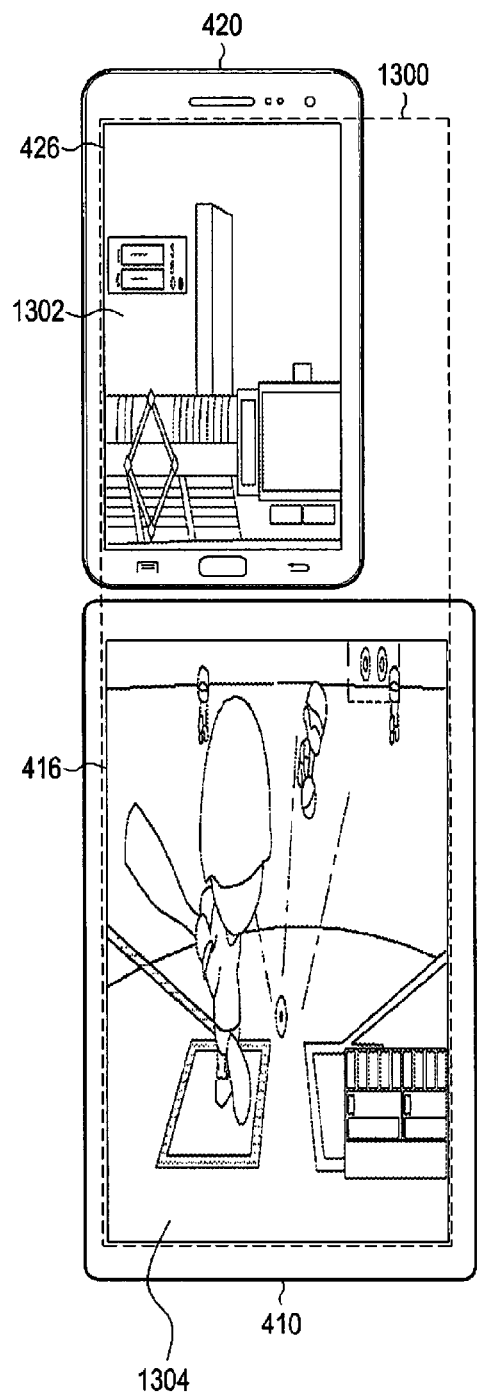
Figure 13B:
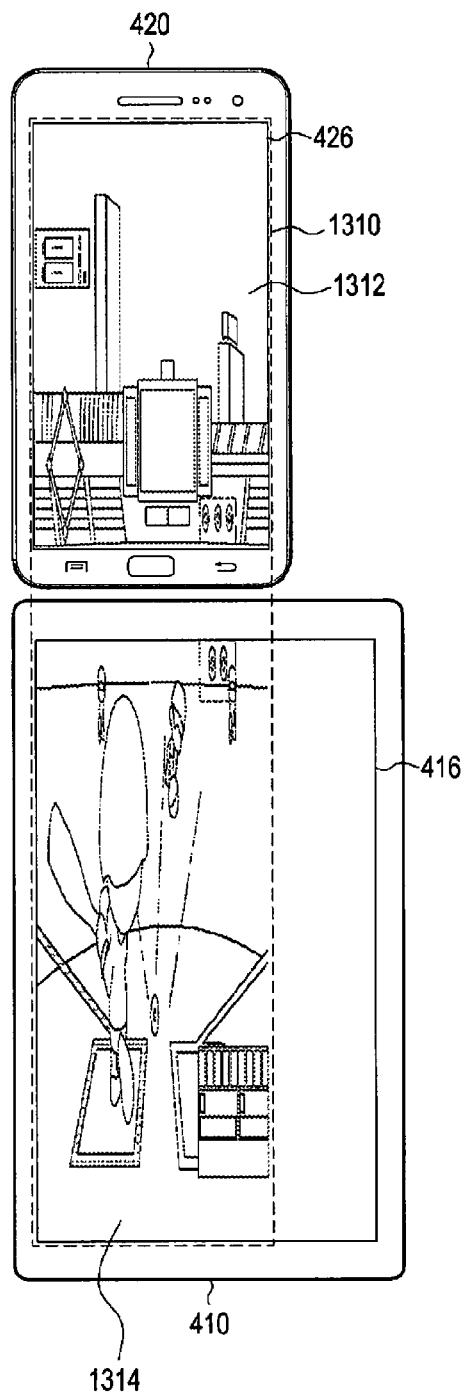

In FIGS. 13A and 13B, electronic device A 410 and electronic device B 420 have the display 416 and the display 426, respectively, of different screen sizes and are arranged vertically and in parallel with each other.

Referring to FIG. 13A, in the case where the display 416 and the display 426 of electronic device A 410 and electronic device B 420, respectively, are of different screen sizes, electronic device A 410 and electronic device B 420 configure a multi-vision screen 1300 in a vertical direction with respect to the larger screen size, that is, with respect to the screen size of the display 416.

Referring to FIG. 13B, in the case where the display 416 and the display 426 of electronic device A 410 and electronic device B 420 are of different screen sizes, electronic device A 410 and electronic device B 420 configure a multi-vision screen 1310 in a vertical direction with respect to the smaller screen size, that is, with respect to the screen size of the display 426.

Figure 14A:
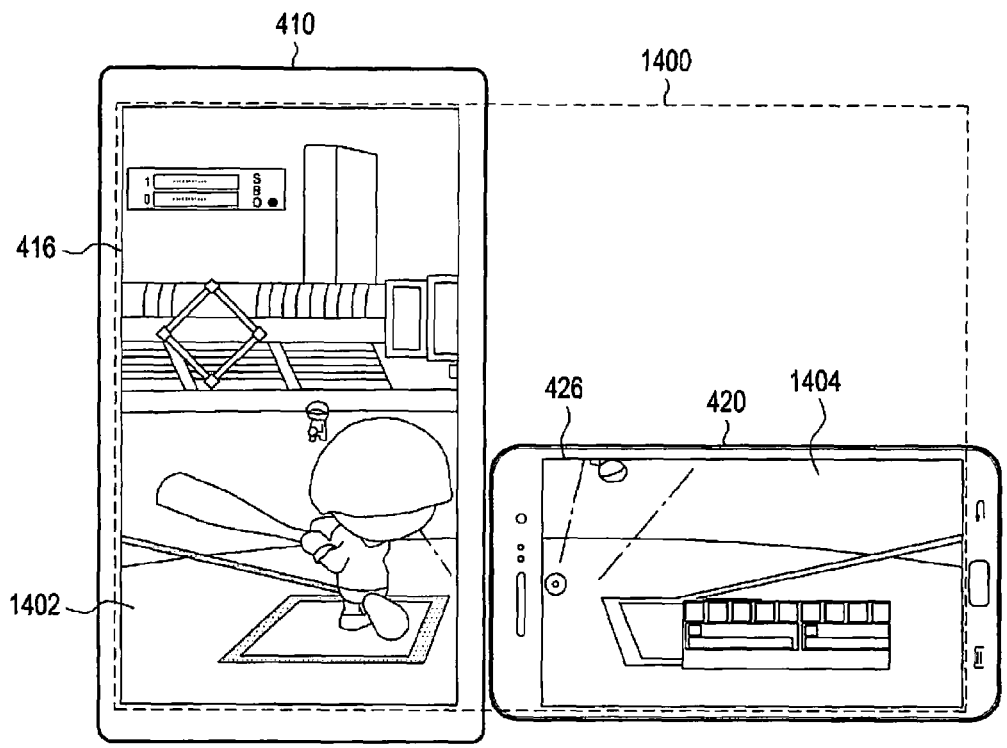
Figure 14B:
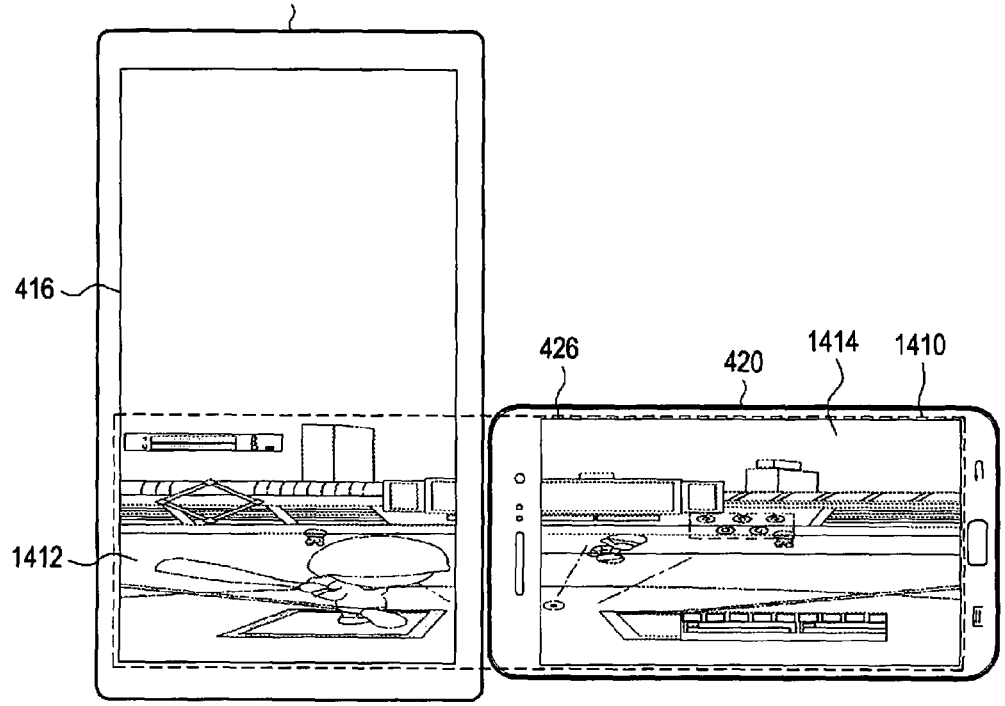

In FIGS. 14A and 14B, electronic device A 410 and electronic device B 420 have the display 416 and the display 426, respectively, of different screen sizes and are arranged horizontally and in parallel with each other. Additionally, one of the electronic devices, for example, electronic device B is rotated.

Referring to FIG. 14A, electronic device A 410 and electronic device B 420 configure a multi-vision screen 1400 in a horizontal direction with respect to the larger screen size, that is, with respect to the screen size of the display 416, taking into account the rotated state of electronic device B 420.

Referring to FIG. 14B, electronic device A 410 and electronic device B 420 configure a multi-vision screen 1410 in a horizontal direction with respect to the smaller screen size, that is, with respect to the screen size of the display 426, taking into account the rotated state of electronic device B 420.

In an embodiment of the present disclosure, after configuring a multi-vision screen, while outputting the content image on the multi-vision screen, electronic device A 410 and electronic device B 420 output an audio signal corresponding to a content image through a speaker. In an embodiment of the present disclosure, electronic device A 410 and electronic device B 420 emit a stereo sound through a plurality of channels according to the relative positions of electronic device A 410 and electronic device B 420.

FIGS. 15A and 15B illustrate an example of outputting audio signals during output of a content image on a multi-vision screen according to various embodiments of the present invention, Referring to FIG. 15A, electronic device A 410 and electronic device B 420 output an L-channel audio signal and an R-channel audio signal respectively through a first speaker 418 of electronic device A 410 and a second speaker 428 of electronic device B 420, while outputting a content image on a multi-vision screen.

Referring to FIG. 15B, if the positions of the electronic devices are switched while outputting a content image on a multi-vision screen, the output audio signal are also switched. For example, as shown in FIG. 5B, if the position of electronic device A 410 is exchanged with the position of electronic device B 420, the L-channel and R-channel audio signals are switched so that electronic device A 410 outputs the R-channel audio signal through the first speaker 418 and electronic device B 420 outputs the L-channel audio signal through the second speaker 428. If there are more than two electronic devices, the audio signals of a plurality of channels is output through speakers of the electronic devices, thus enabling output of a stereo or surround sound.

Figure 16A:
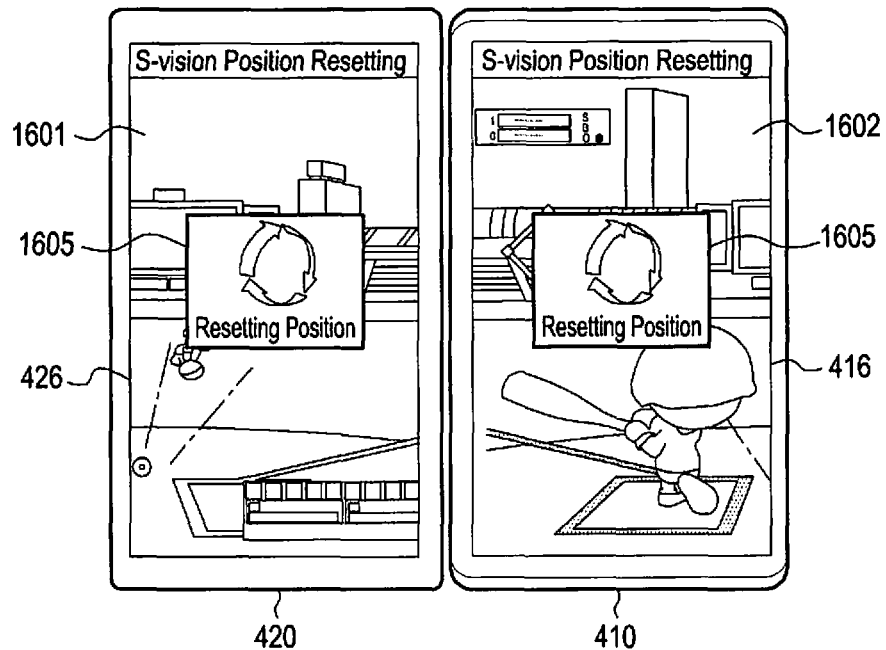
FIGS. 16A and 16B illustrate an example of indicating that a relative position is being re-determined on screens of two electronic devices according to various embodiments of the present invention.
Figure 16B:
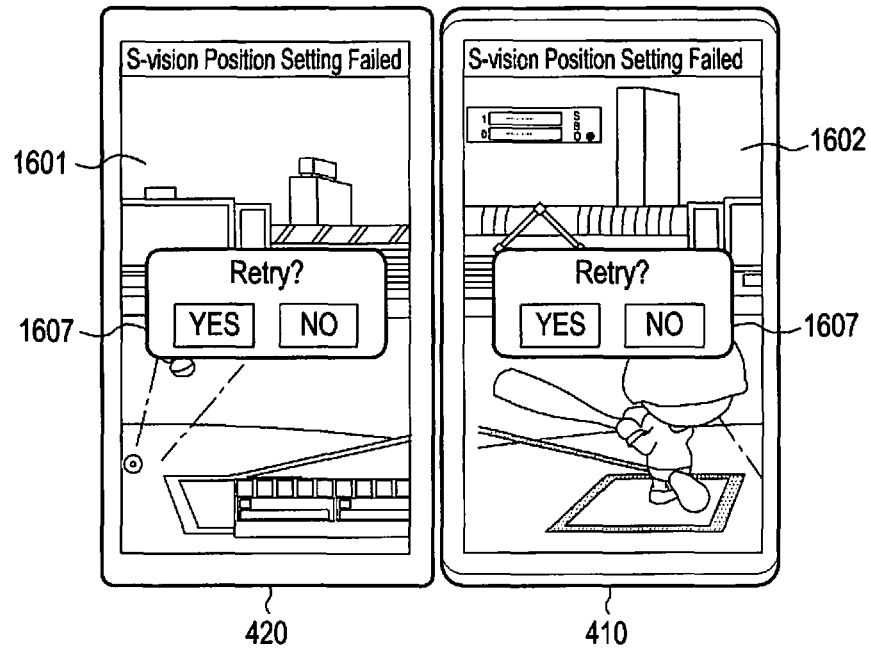

FIGS. 16A and 16B illustrate an example of indicating that a relative position is being re-determined on screens of two electronic devices according to various embodiments of the present invention.

In an embodiment of the present invention, if sensing information of any of a plurality of electronic devices is changed while a content image is being output on a multi-vision screen, a screen indicating that a relative position is being re-determined is displayed on a display of each of the plurality of electronic devices to re-determine the relative position between the electronic devices.

Referring to FIG. 16A, if sensing information is changed while electronic device A 410 and electronic device B 420 are outputting a first screen 1601 and a second screen 1602 on the display 416 and the display 426, respectively, for a multi-vision screen, electronic device A 410 and electronic device B 420 automatically re-determine their relative positions using the changed sensing information and display an image 1605 indicating that a relative position is being determined.

Referring to FIG. 16B, if sensing information is changed while electronic device A 410 and electronic device B 420 are outputting the first screen 1601 and the second screen 1602 on the display 416 and the display 426, respectively, for a multi-vision screen, electronic device A 410 and electronic device B 420 indicates that the relative position setting has been failed and displays a message 1607 prompting a user to select whether to re-determine the relative position. If the user selects YES, the relative position is re-determined and if the user selects NO, the relative position is not re-determined.

In various embodiments of the present disclosure, a plurality of electronic devices determines a change in a relative position using various pieces of sensing information.

FIGS. 17A-17C, 18, and 19 illustrate a method for determining a relative position change in two electronic devices according to various embodiments of the present invention Referring to FIGS. 17A-17C, if the position of electronic device A 410 is exchanged with the position of electronic device B 420, as shown in FIGS. 17A and 17B, while they are displaying a content image on a multi-vision screen 1700 formed by a first screen 1702 and a second screen 1704 on the display 416 and the display 426, respectively, sensing information of electronic device A 410 and electronic device B 420 be changed. Thus, electronic device A 410 and electronic device B 420 re-determine their relative positions and display an image 1705, as shown in FIG. 7C, indicating that the relative position is being re-determined.

Figure 18:
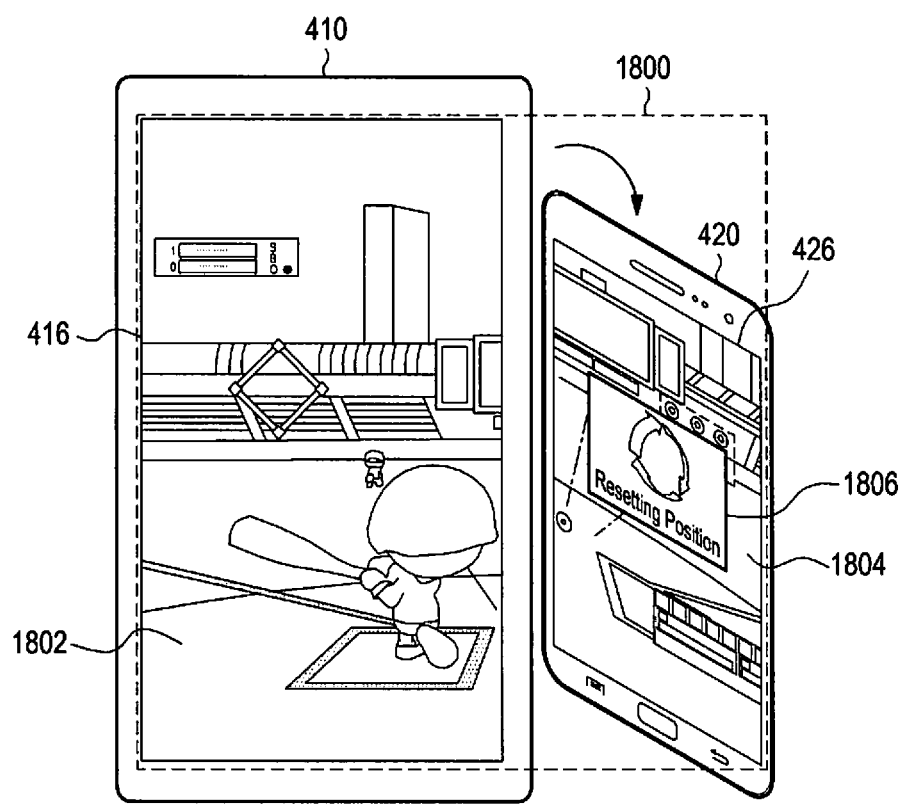

Referring to FIG. 18, if the inclination of electronic device B 420 is changed while it is displaying a content image on a multi-vision screen 1800 formed in a horizontal direction by a first screen 1802 and a second screen 1804 on the display 416 and the display 426 of electronic device A 410 and electronic device B 420, respectively, sensing information of electronic device A 410 and electronic device B 420 is changed. Thus, electronic device A 410 and electronic device B 420 re-determine their relative positions using the changed sensing information and display an image 1806 indicating that a relative position is being re-determined.

Figure 19:
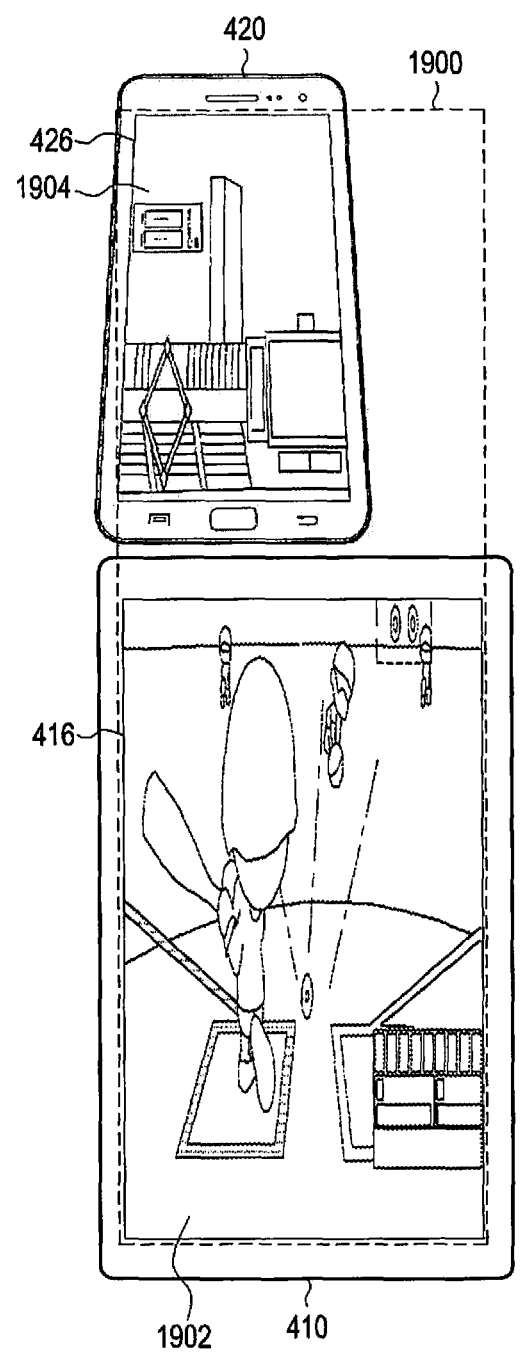

Referring to FIG. 19, if the inclination of electronic device B 420 is changed while it is displaying a content image on a multi-vision screen 1900 formed in a vertical direction by a first screen 1902 and a second screen 1904 on the display 416 and the display 426 of the electronic device A 410 and the electronic device B 420, respectively, sensing information of electronic device A 410 and electronic device B 420 is changed. Thus, electronic device A 410 and electronic device B 420 re-determine their relative positions and display an image indicating that a relative position is being re-determined.

Figure 20:
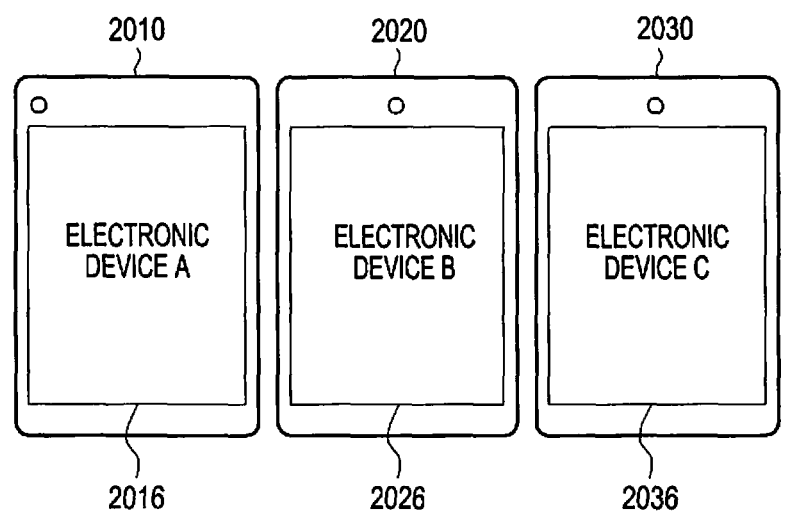
FIG. 20 illustrates three electronic devices used in the configuration of a multi-vision screen according to an embodiment of the present invention

FIG. 20 explains a concept of forming a multi-vision screen using a plurality of electronic devices according to another embodiment of the present invention.

In various embodiments of the present invention, three electronic devices configure a multi-vision screen using three display screens according to their relative positions and output content to the multi-vision screen by interacting with one another through communication.

Referring to FIG. 20, three electronic devices, for example, an electronic device A 2010, an electronic device B 2020, and an electronic device C 2030 interact with one another. One of electronic device A 2010, electronic device B 2020, and electronic device C 2030 acts as a host, determines the relative positions of electronic device A 2010, electronic device B 2020, and electronic device C 2030, and configures a multi-vision screen using a display 2016 of electronic device A 2010, a display 2026 of electronic device B 2020, and a display 2036 of electronic device C 2030, based on the relative positions of the electronic devices. In an embodiment of the present invention, electronic device B 2020 acts as the host, by way of example.

Figure 21:
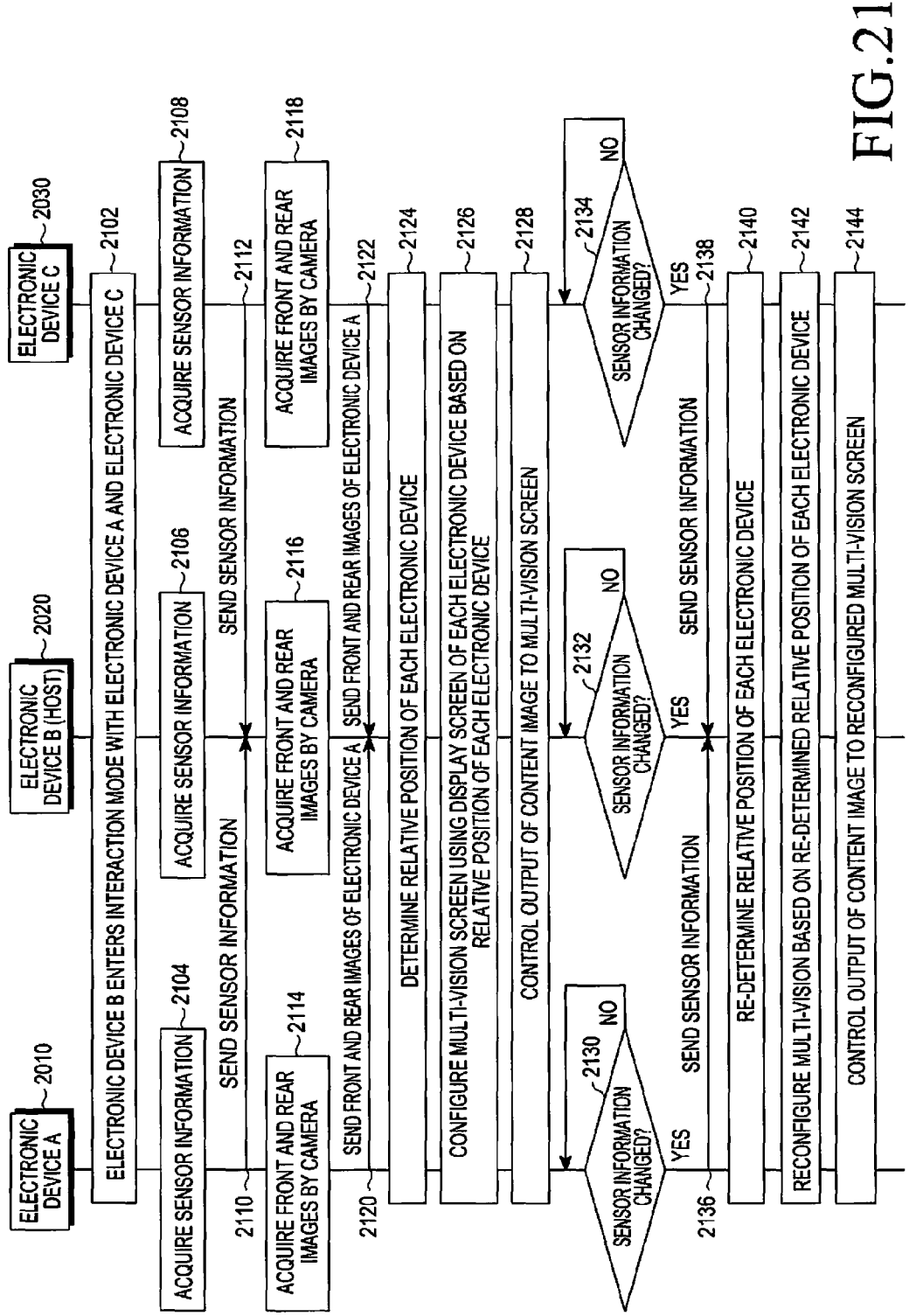
FIG. 21 is a flowchart illustrating a method for controlling output of a content image to a multi-vision screen, based on the relative positions of three electronic devices, according to an embodiment of the present invention.

FIG. 21 is a flowchart illustrating a method for controlling output of a content image to a multi-vision screen, based on the relative positions of three electronic devices, according to an embodiment of the present invention.

Referring to FIG. 21, electronic device B 2020 enters the interaction mode with electronic device A 2010 and electronic device C 2030 in step 2102. In the interaction mode, electronic device B 2020 interacts with electronic device A 2010 and electronic device C 2030 by communication and exchanges device information with electronic device A 2010 and electronic device C 2030. The device information about electronic device A 2010, electronic device B 2020, and electronic device C 2030 includes display size information, resolution information, detailed component information, and user information.

In steps 2104, 2106, and 2108, each of electronic device A 2010, electronic device B, and electronic device C 2030 acquires sensing information. For example, each of electronic device A 2010, electronic device B 2020, and electronic device C 2030 acquires sensing information by its sensor unit.

The sensing information includes values sensed by an acceleration sensor, a gravity sensor, an inertial sensor, and a geomagnetic sensor. Electronic device B 2020 receives sensing information from electronic device A 2010 and electronic device C 2030 through a communication unit in step 2112.

In steps 2114, 2116, and 2118, each of electronic device A 2010, electronic device B 2020, and electronic device C 2030 acquires both front and rear images captured by a camera. For example, each of electronic device A 2010, electronic device B 2020, and electronic device C 2030 acquires a front image captured by a first camera and a rear image captured by a second camera. Alternatively, one of the front or rear images may be captured. In steps 2120 and 2122, electronic device B 2020 receives the front and rear images captured by electronic device A 2010 and electronic device C 2030. Again, as an alternative, one of the front or rear images may be received.

In step 2124, electronic device B 2020 determines the relative positions of electronic device A 2010, electronic device B 2020, and electronic device C 2030 using the front or rear images of electronic device A 2010, electronic device B 2020, and electronic device C 2030. For example, the relative positions include directions of electronic device A 2010 and electronic device C 2030 with respect to electronic device B 2020 or the distance between electronic device A 2010 and electronic device B 2020 and the distance between electronic device B 2020 and electronic device C 2030.

Specifically, for example, with electronic device A 2010, electronic device B 2020, and electronic device C 2030 placed on the same plane, if each of electronic device A 2010, electronic device B 2020, and electronic device C 2030 captures a front image by a front camera, for example, an object (for example, a ceiling), then images captured by electronic device A 2010, electronic device B 2020, and electronic device C 2030 may be different because electronic device A 2010, electronic device B 2020, and electronic device C 2030 are at different positions. Additionally, in an embodiment of the present disclosure, electronic device B 2020 determines the relative positions of electronic device A 2010, electronic device B 2020, and electronic device C 2030 by extracting feature points from the first, second, and third images of the same object captured by electronic device A 2010, electronic device B 2020, and electronic device C 2030, respectively, and comparing the feature points of each of the images.

Further, electronic device B 2020 determines inclination information and rotation information about each of electronic device A 2010, electronic device B 2020, and electronic device C 2030 using sensing information about each of electronic device A 2010, electronic device B 2020, and electronic device C 2030. For example, electronic device B 2020 determines rotation degrees of electronic device A 2010, electronic device B 2020, and electronic device C 2030 with respect to a horizontal direction or determines inclinations of electronic device A 2010, electronic device B 2020, and electronic device C 2030 with respect to a gravity direction, using the sensing information of electronic device A 2010, electronic device B 2020, and electronic device C 2030.

In step 2126, electronic device B 2020 configure a multi-vision screen using the display 2016, the display 2026, and the display 2036 of electronic device A 2010, electronic device B 2020, and electronic device C 2030, based on the relative positions of electronic device A 2010, electronic device B 2020, and electronic device C 2030.

Electronic device B 2020 controls output of content to the multi-vision screen in step 2128. For example, a part of the content image is displayed on the display 2016 of electronic device A 2010, another part of the content image is displayed on the display 2026 of electronic device B 2020, and the remaining part of the content image is displayed on the display 2036 of electronic device C 2030.

While the content is being output to the multi-vision screen, in steps 2130, 2132, and 2134, each of electronic device A 2010, electronic device B 2020, and electronic device C 2030 determines whether at least one of the sensing information of electronic device A 2010, the sensing information of electronic device B 2020, and the sensing information of electronic device C 2030 has been changed. For example, each of electronic device A 2010, electronic device B 2020, and electronic device C 2030 determines whether any of values sensed by the acceleration sensor, the gravity sensor, the inertial sensor, and the geomagnetic sensor has been changed. If the sensing information has been changed, each of electronic device A 2010 and electronic device C 2030 transmits the changed sensing information to electronic device B 2020 in steps 2136 and 2138.

In step 2140, electronic device B re-determines the relative positions of electronic device A 2010, electronic device B 2020, and electronic device C 2030. In step 2142, electronic device B 2020 reconfigures the multi-vision screen based on the re-determined relative positions. Electronic device B 2020 controls output of the content to the reconfigured multi-vision screen in step 2144.

Figure 22:
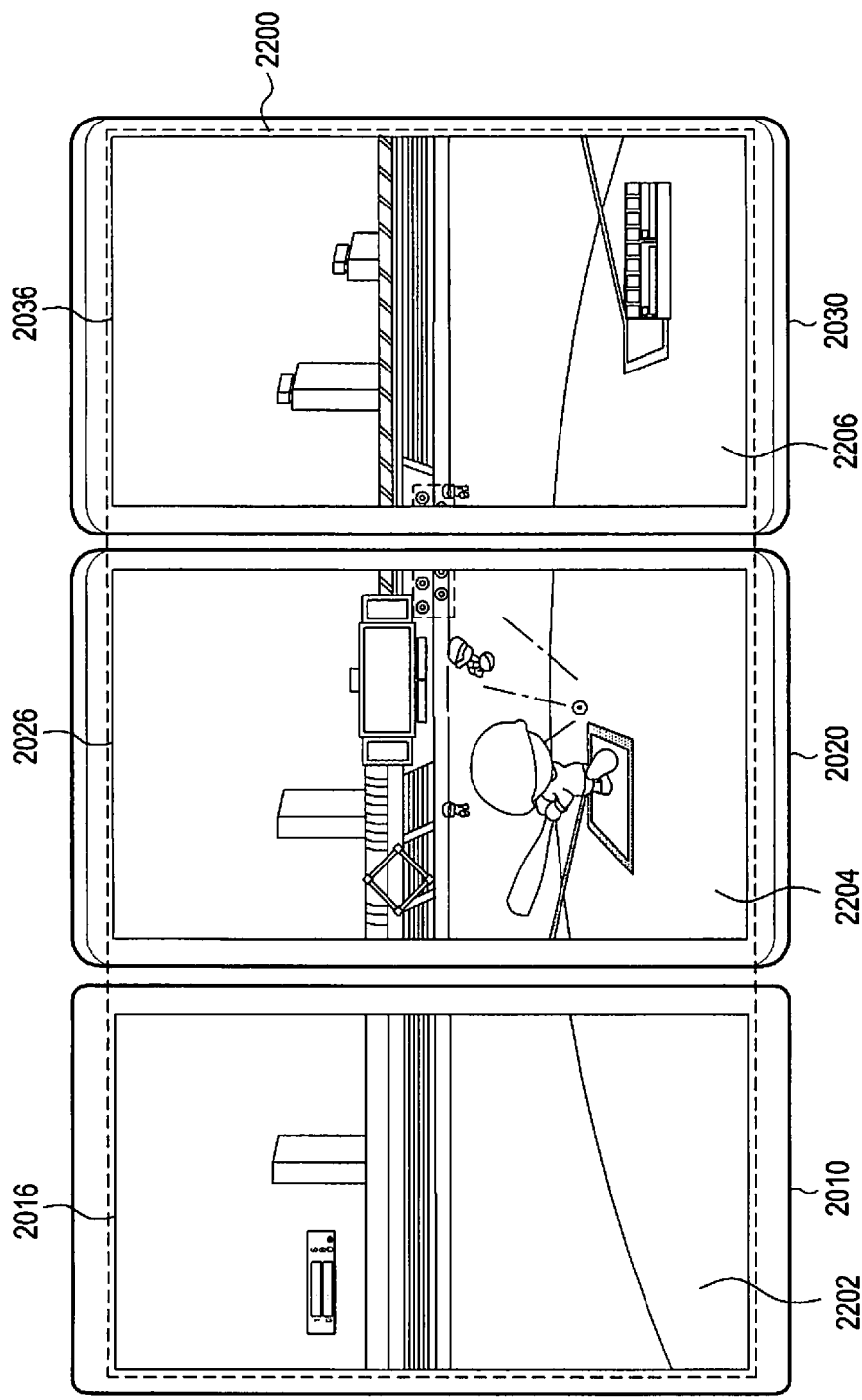
FIG. 22 illustrates a multi-vision screen formed using three electronic devices according to an embodiment of the present invention.

FIG. 22 illustrates a multi-vision screen formed using three electronic devices according to an embodiment of the present invention.

Referring to FIG. 22, when electronic device A 2010, electronic device B 2020, and electronic device C 2030 are arranged horizontally and in parallel with one another, a multi-vision screen 2200 is configured horizontally using the displays 2016, 2026, and 2036 of electronic device A 2010, electronic device B 2020, and electronic device C 2030, respectively, and one content image is displayed separately in the first, second, and third areas of the multi-vision screen 2200. For example, a first part of the content image 2202 is displayed on the display 2016 of electronic device A 2010, a second part of the content image 2204 is displayed on the display 2026 of electronic device B 2020, and a third part of the content image 2206 is displayed on the display 2026 of electronic device C 2030. Or the same content image is displayed on the respective display 2016, display 2026, and display 2036 of electronic device A 2010, electronic device B 2020, and electronic device C 2030.

The proposed electronic device and control method using a relative position between a plurality of electronic devices in the electronic device may be implemented as computer-readable code in a computer-readable recording medium. The computer-readable recording medium may include any kind of recording device storing computer-readable data. Examples of the recording medium include Read Only Memory (ROM), Random Access Memory (RAM), optical disk, magnetic tape, floppy disk, hard disk, non-volatile memory, and the like, and also include the medium that is implemented in the form of carrier waves (for example, transmission over the Internet). In addition, the computer-readable recording medium may be distributed over the computer systems connected over the network, and computer-readable codes may be stored and executed in a distributed manner.

As is apparent from the foregoing description, when a multi-vision screen is configured using a plurality of electronic devices, the multi-vision screen is automatically configured based on a relative position between the plurality of electronic devices, without the need for a user's manual input. Thus user convenience can be increased.

Further, with a multi-vision screen configured using a plurality of electronic devices, if the relative position of any of the electronic devices has been changed, an image output to the multi-vision screen is automatically re-adjusted. Thus, user convenience can be increased.

While the disclosure has been shown and described with reference to certain embodiments thereof, it will be understood by those skilled in the art that various changes in form and details be made therein without departing from the spirit and scope of the disclosure as defined by the appended claims and their equivalents.

What is claimed is:

1. A control method of an electronic for configuring a multi-vision screen using a relative position of the electronic device, the control method comprising:
   interacting, by the electronic device, with at least one other electronic device;
   capturing a first front image and a first rear image with the electronic device;
   receiving, from the at least one other electronic device, a second front image and a second rear image captured by the at least one other electronic device;
   determining relative positions of the electronic device and the at least one other electronic device by comparing the first front image with the second front image and/or comparing the first rear image with the second rear image;
   configuring a multi-vision screen using a display of the electronic device and a display of the at least one other electronic device, based on the determined relative positions; and
   controlling output of a content image on the multi-vision screen.

2. The control method of claim 1, further comprising:
   acquiring first sensing information about the electronic device;
   receiving second sensing information about the at least one other electronic device, from the at least one other electronic device; and
   determining rotation information and inclination information about the electronic device and the at least one other electronic device, using the first sensing information and the second sensing information.

3. The control method of claim 1, further comprising configuring a stereo speaker of a plurality of channels using speakers of the electronic device and speakers of the at least one other electronic device, based on the determined relative positions.

4. The control method of claim 2, further comprising:
   determining whether the first sensing information and the second sensing information have changed;
   when at least one of the first sensing information and the second sensing information has changed, re-determining the relative positions of the electronic device and the at least one other electronic device; and
   reconfiguring the multi-vision screen based on the re-determined relative positions.

5. The control method of claim 1, further comprising displaying a screen indicating that a relative position is being determined, when the relative positions are determined.

6. An electronic device comprising:
   a display;
   a front camera for capturing a first front image;
   a rear camera for capturing a first rear image;
   a communication unit for communicating with at least one other electronic device; and
   a controller for capturing the first front image through the front camera and for capturing the first rear image through the rear camera, receiving, from the at least one other electronic device, a second front image and a second rear image captured by the at least one other electronic device, determining relative positions of the electronic device and the at least one other electronic device by comparing the first front image with the second front image and/or comparing the first rear image with the second rear image, configuring a multi-vision screen using a display of the electronic device and a display of the at least one other electronic device, based on the determined relative positions, and controlling output of a content image on the multi-vision screen.

7. The electronic device of claim 6, further comprising a sensor unit for acquiring first sensing information about the electronic device,
   wherein the sensor unit includes at least one of a geomagnetic sensor, a gravity sensor, and an acceleration sensor, and
   wherein the controller receives second sensing information about the electronic device, from the at least one other electronic device and determines rotation information and inclination information about the electronic device and the at least one other electronic device, using the first sensing information and the second sensing information.

8. The electronic device of claim 6, wherein the controller configures a stereo speaker of a plurality of channels, using speakers of the electronic device and speakers of the at least one other electronic device, based on the determined relative positions.

9. The electronic device of claim 7, wherein the controller determines whether first sensing information and second sensing information have changed, when at least one of the first sensing information and the second sensing information has changed, re-determines the relative positions of the electronic device and the at least one other electronic device, and reconfigures the multi-vision screen based on the re-determined relative positions.

10. The electronic device of claim 6, wherein the display displays a screen indicating that a relative position is being determined, when the relative positions are determined.

* * * * *